(12) United States Patent
Nagata et al.

(10) Patent No.: US 8,910,338 B2
(45) Date of Patent: Dec. 16, 2014

(54) LENS CLEANER

(75) Inventors: Hideo Nagata, Kyoto (JP); Junji Takamoto, Kyoto (JP); Noboru Wakitani, Kyoto (JP); Yuji Hori, Kyoto (JP); Junichi Takatori, Kyoto (JP); Toshiaki Iwao, Kyoto (JP); Masahiko Nishimura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 298 days.

(21) Appl. No.: 12/866,512

(22) PCT Filed: Jul. 31, 2008

(86) PCT No.: PCT/JP2008/064177
§ 371 (c)(1),
(2), (4) Date: Aug. 6, 2010

(87) PCT Pub. No.: WO2009/110116
PCT Pub. Date: Sep. 11, 2009

(65) Prior Publication Data
US 2011/0010884 A1    Jan. 20, 2011

(30) Foreign Application Priority Data

Mar. 7, 2008 (JP) .................. 2008-057658
May 29, 2008 (JP) .................. 2008-141493

(51) Int. Cl.
*A47L 25/00* (2006.01)
*G11B 23/03* (2006.01)
*G11B 7/12* (2012.01)

(52) U.S. Cl.
CPC .......... *G11B 7/1201* (2013.01); *G11B 23/0327* (2013.01)

USPC .......................................... 15/210.1

(58) Field of Classification Search
USPC .................. 15/104.93, 104.94, 210.1, 214; 369/273; 360/128; 720/671, 718–719
See application file for complete search history.

(56) References Cited

U.S. PATENT DOCUMENTS 4,375,658 A * 3/1983 Martinelli .................. 360/128
4,482,929 A * 11/1984 Beck et al. ................. 360/133
(Continued)

FOREIGN PATENT DOCUMENTS

CN    1361533    7/2002
CN    1497596    5/2004
(Continued)

OTHER PUBLICATIONS

International Search Report for PCT/JP2008/064177, mailed Sep. 9, 2008.
(Continued)

*Primary Examiner* — Rachel Steitz
*Assistant Examiner* — Jennifer Gill
(74) *Attorney, Agent, or Firm* — Nixon & Vanderhye P.C.

(57) ABSTRACT

A lens cleaner (10) cleans a pickup lens (38) within an optical disk device (12). The lens cleaner (10) includes a disk portion (16) and a grip (20) provided at the rear end thereof. A user inserts the lens cleaner (10) into a slot (14) of the optical disk device (12) with the grip (20) holding with a hand (18) to thereby load the lens cleaner (10) into the interior of the optical disk device 12. When the user turns the lens cleaner (10) right and left with the grip (20) holding, a lens surface is cleaned by a cleaning member upheaving on a bottom surface of the disk portion (16).

7 Claims, 23 Drawing Sheets

(56) References Cited

U.S. PATENT DOCUMENTS

| | | | |
|---|---|---|---|
| 4,663,686 A * | 5/1987 | Freeman et al. | 360/128 |
| 4,779,300 A * | 10/1988 | Pompe | 15/104.93 |
| 5,025,526 A | 6/1991 | Ichitsubo et al. | |
| 5,040,160 A * | 8/1991 | Moriya | 369/71 |
| 5,235,485 A * | 8/1993 | Martin | 360/128 |
| 5,307,334 A | 4/1994 | Sato | |
| 5,488,596 A * | 1/1996 | Martin | 369/71 |
| 5,499,228 A * | 3/1996 | Takeda | 369/71 |
| 5,953,301 A * | 9/1999 | Shimo et al. | 369/71 |
| 6,028,830 A * | 2/2000 | Fritsch et al. | 369/71 |
| 6,441,996 B1 * | 8/2002 | Weng | 360/128 |
| 6,646,971 B1 | 11/2003 | Griffin | |
| 7,197,755 B2 * | 3/2007 | Kobayashi | 720/671 |
| 7,475,411 B2 * | 1/2009 | Matsui et al. | 720/648 |
| D616,167 S * | 5/2010 | Yamamoto et al. | D32/35 |
| 8,064,311 B2 * | 11/2011 | Holbrook et al. | 369/71 |
| 2002/0085464 A1 | 7/2002 | Mashimo | |
| 2004/0139457 A1 | 7/2004 | Kobayashi | |
| 2005/0055705 A1 * | 3/2005 | Fritsch et al. | 720/671 |
| 2008/0230175 A1 * | 9/2008 | Fritsch et al. | 156/242 |

FOREIGN PATENT DOCUMENTS

| | | |
|---|---|---|
| JP | 61-203426 | 12/1986 |
| JP | 63-237274 | 10/1988 |
| JP | 02-158975 | 6/1990 |
| JP | 05-144057 | * 11/1991 |
| JP | 04-126321 | 11/1992 |
| JP | 05-144057 | 6/1993 |
| JP | 06-311954 | 8/1994 |
| JP | 07-105558 | 4/1995 |
| JP | 07-210891 | 8/1995 |
| JP | 08-055356 | 2/1996 |
| JP | 11-134830 | 5/1999 |
| JP | 2003-257150 | 9/2003 |
| JP | 2004-342284 | 2/2004 |
| JP | 2004-139635 | 5/2004 |
| JP | 2008-041206 | 2/2008 |

OTHER PUBLICATIONS

Japanese Office Action issued in JP 2010-501756 on Nov. 20, 2012.

* cited by examiner

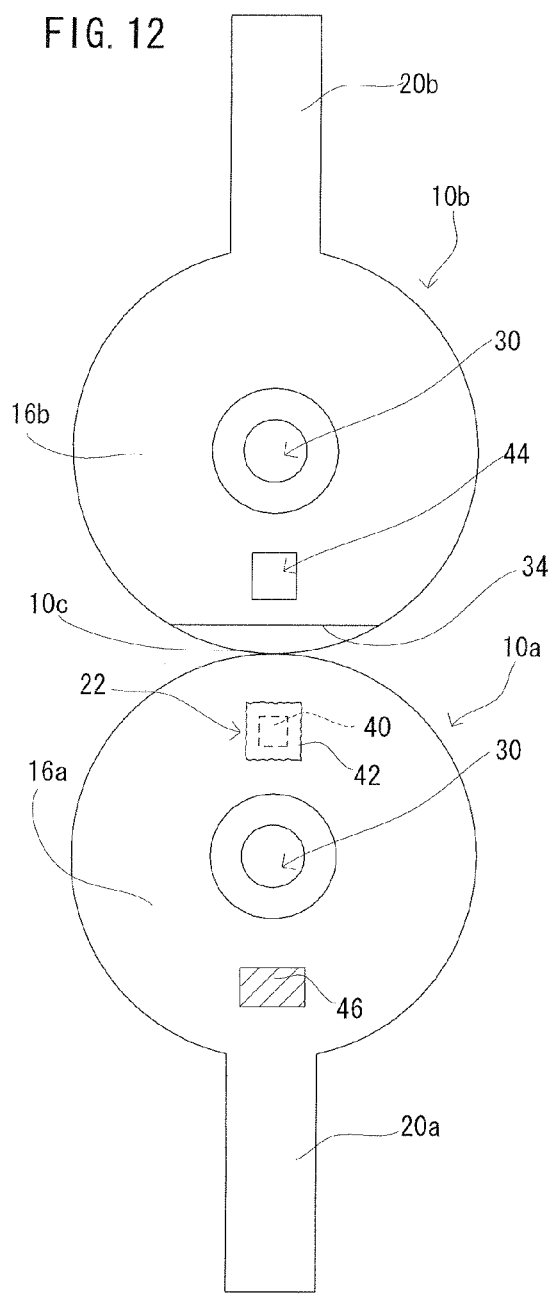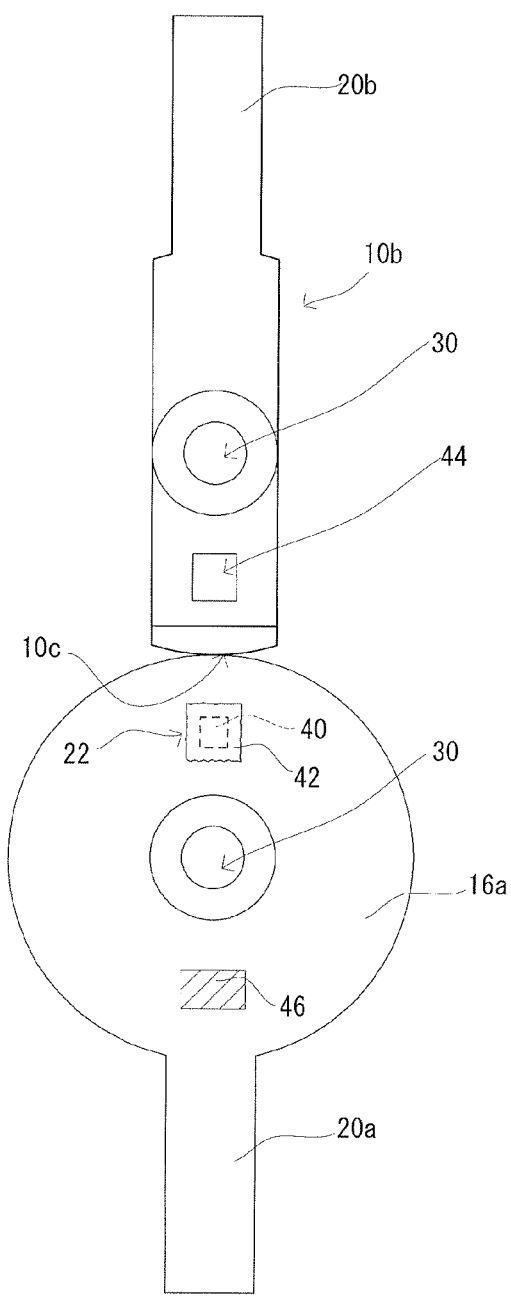

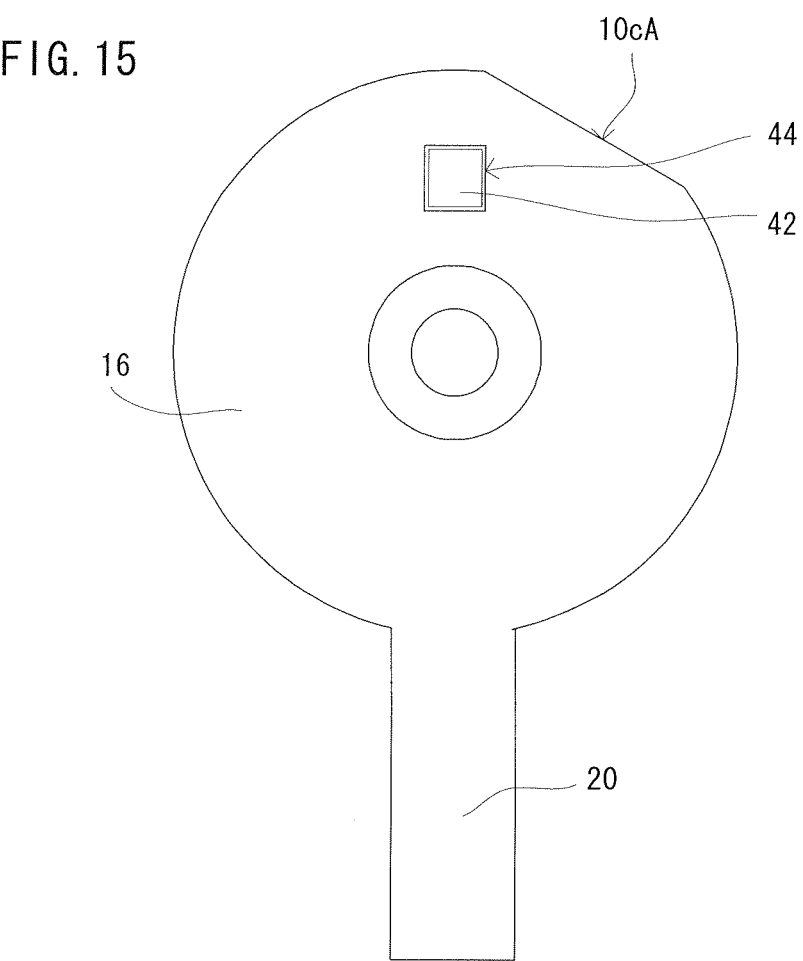

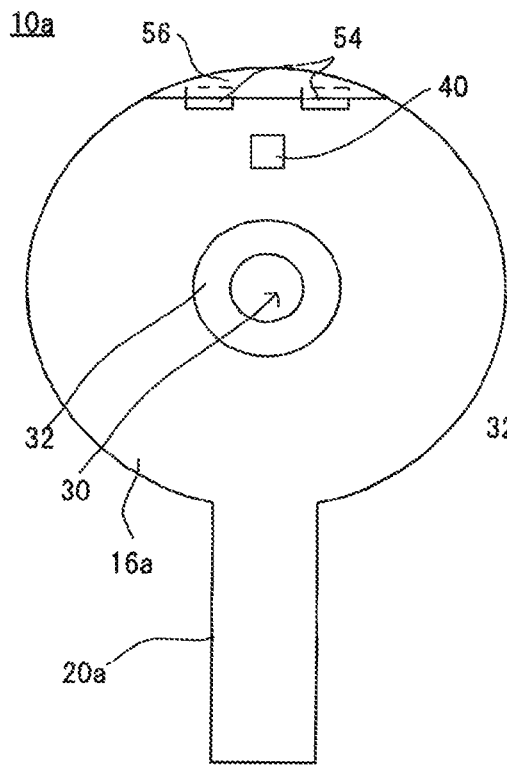
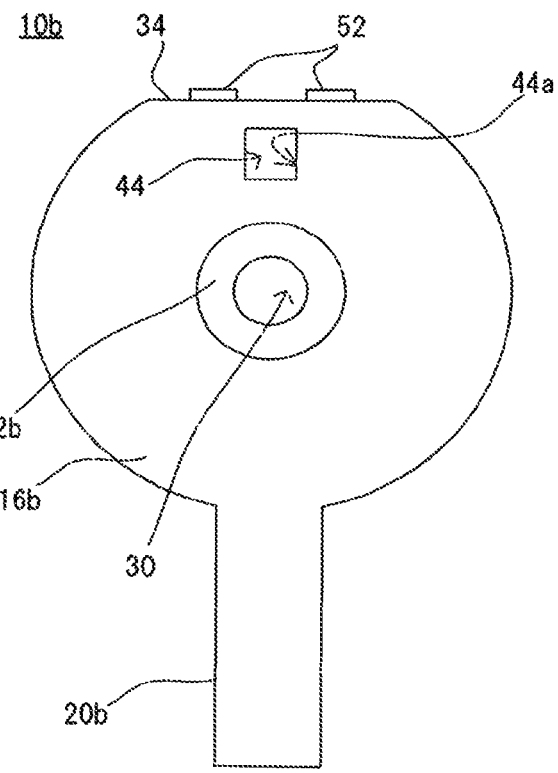
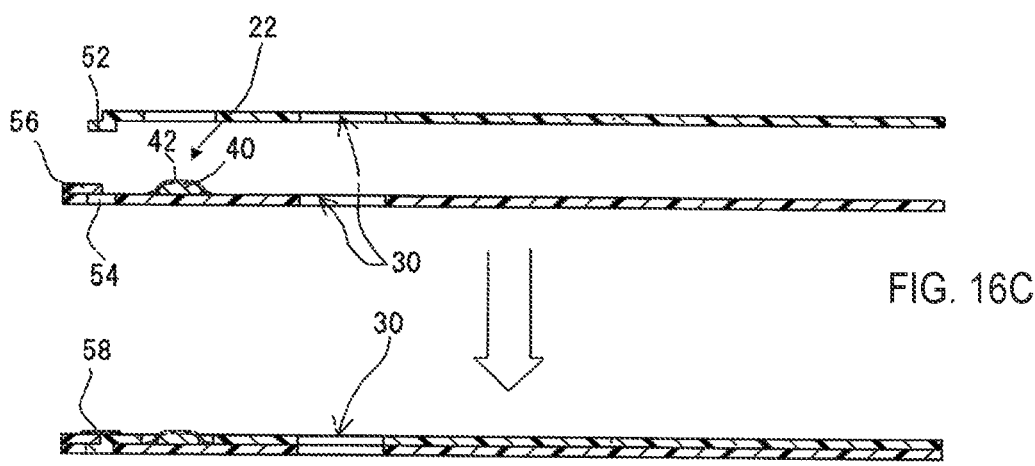

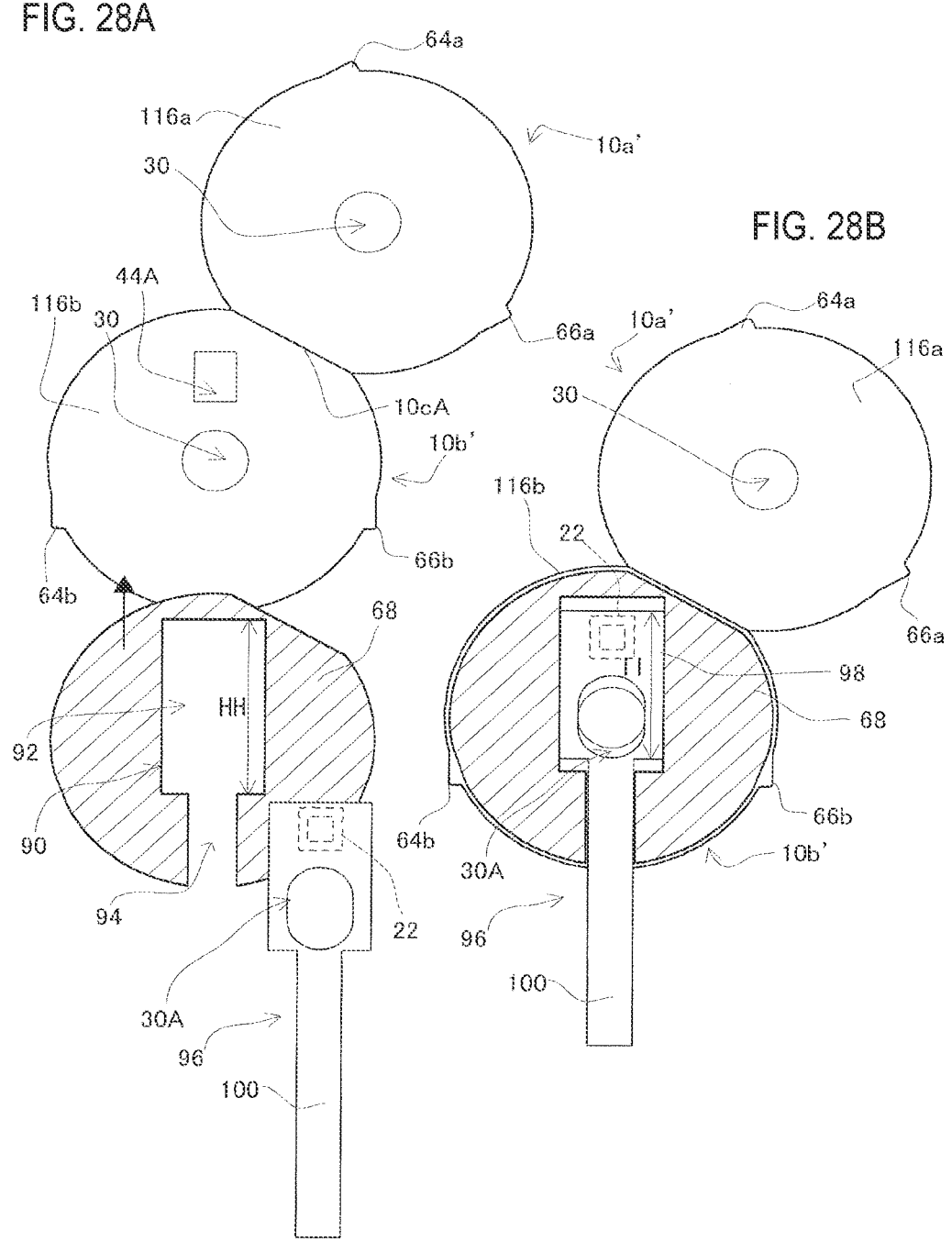

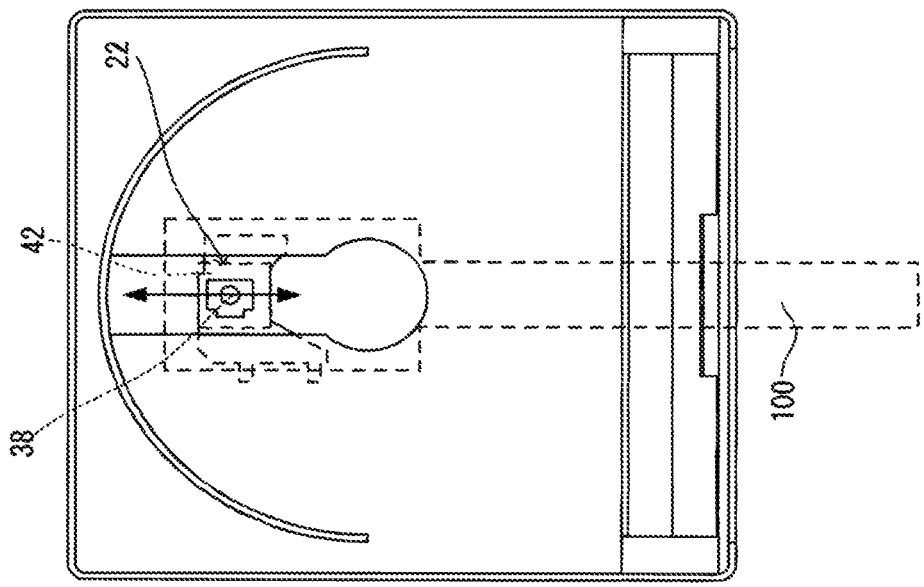
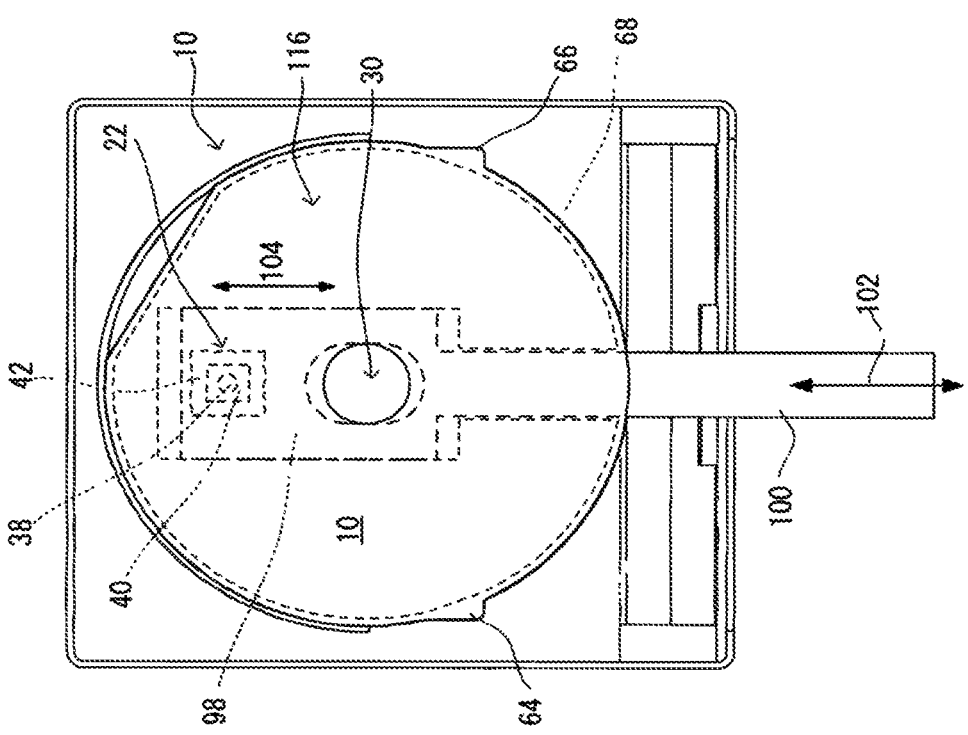

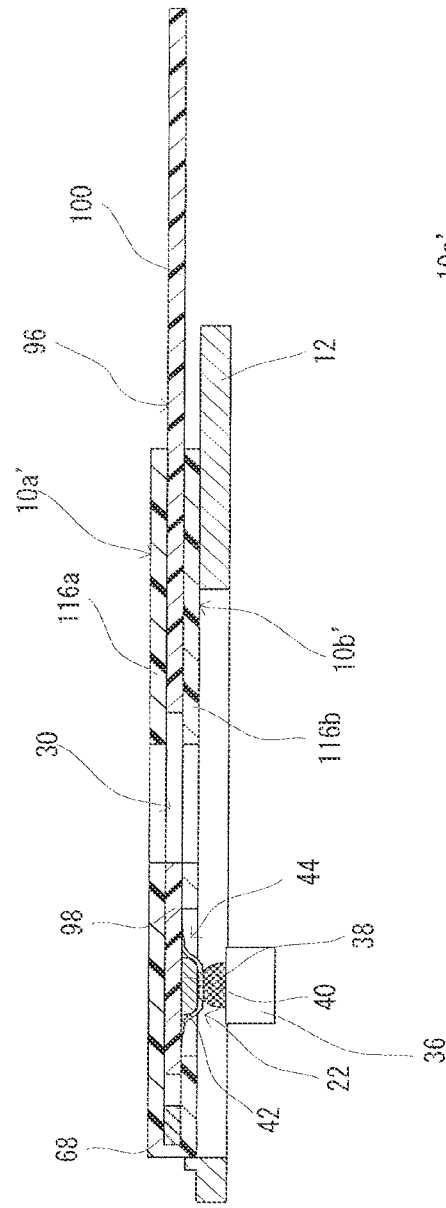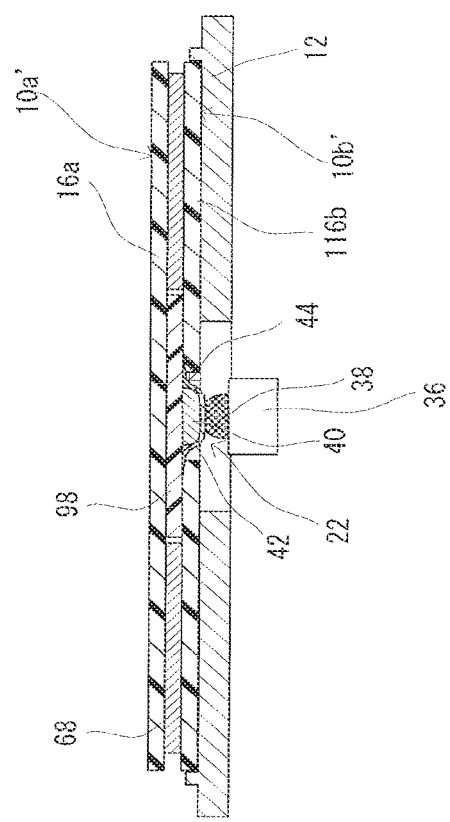

LENS CLEANER

This application is the U.S. national phase of International Application No. PCT/JP2008/064177, filed 31 Jul. 2008, which designated the U.S. and claims priority to Japanese Patent Application No(s). 2008-057658, filed 7 Mar. 2008, and 2008-141493, filed 29 May 2008, the entire contents of each of which are hereby incorporated by reference.

TECHNICAL FIELD

The present invention relates to a lens cleaner. More specifically, the present invention relates to a lens cleaner which manually cleans a pickup lens of an optical disk device in a slot-in type.

BACKGROUND ART

A related art of such a kind is disclosed in a Japanese Patent Application Laid-Open No. 2004-139635 [G11B 23/00 G11B 7/12] (Patent Document 1). A lens cleaner of the Patent Document 1 is manually inserted into a disk device, and is turned right and left in an inserted state, capable of cleaning an objective lens of a pickup with a cleaning member.

As to the lens cleaner of the Patent Document 1, a bristle brush is used as the cleaning member, so this can remove dirt and dust, but has little effect with tar of cigarettes and oil. Because the bristle brush is mainly intended for sweeping a dust, etc., and is partially contact with the dirt, it cannot absorb the tar and the oil and has little advantage in cleaning necessary for wiping.

SUMMARY OF THE INVENTION

Therefore, it is a primary object of the present invention to provide a novel lens cleaner.

Another object of the present invention is to provide a lens cleaner capable of surely removing a tough deposit.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a lens cleaner to be used in an optical disk device incorporated with an objective lens, comprising: a disk portion which has a shape capable of being inserted into the optical disk device; a grip which is provided to the disk portion; and a swelling soft member which is provided at a predetermined position corresponding to the objective lens on a main surface of the disk portion, and is able to be brought into contact with the objective lens when the disk portion is inserted into the optical disk device.

In the first invention, a lens cleaner (10: reference numeral designating a corresponding portion in the embodiments. The same is true for the following description.) has a disk portion (16) of a disk-like shape, for example, and has a grip (20) provided thereto. The user applies a cleaning agent such as alcohol to a swelling soft member (22, 42), and inserts the disk portion into the optical disk device (12) with the grip holding. When the optical disk device detects insertion of the disk portion, a loading mechanism (not illustrated) of the optical disk device is actuated to automatically take the disk portion into the interior thereof.

After the disk portion (16) of the lens cleaner (10) is taken in the interior, a chucking mechanism (not illustrated) of the optical disk device is actuated to make a chucking by sandwiching an attaching area of the disk portion between a turntable and a clamper. Here, in a case that the lens cleaner (10) is inserted, the swelling soft member (22) exists at the pickup portion, and this makes a reflection factor extremely lower than that of a normal disk, and whereby, the optical disk device never rotates the loaded object (lens cleaner) at this time.

Then, the user swings the grip (20) right and left. The disk portion (16) of the lens cleaner (10) is secured to the turntable and thus in a rotatable state. Accordingly, when the grip (20) is swung right and left, the disk portion, that is, the swelling soft member (22) is turned. The swelling soft member, because being projected downward from the disk portion, moves in response to the turning while being in contact with the surface of the objective lens, and removes the deposit on the surface of the objective lens.

A second invention is a lens cleaner according to the first invention, wherein the swelling soft member includes a base provided at the predetermined position on the main surface of the disk portion, wherein a sheet-like member which is put over the base member so as to cover the base member.

In the second invention, at the predetermined position (position corresponding to the objective lens) on the surface of the disk portion (16), a base (40, 16aA) being made of a soft member, for example, is formed, and a sheet-like member (42) is put over the base. Accordingly, in the second invention, the sheet-like member (42) comes in contact with the lens.

A third invention is a lens cleaner according to the second invention, wherein the base includes an elastic member. The elastic member is a sponge, for example.

A fourth invention is a lens cleaner according to the second invention or the third invention, wherein the disk portion includes a first disk portion and a second disk portion to be stacked on the first disk portion, the base is formed at a position corresponding to the predetermined position on the first disk portion, and the sheet-like member is put over the base, a window is formed at a position corresponding to the predetermined position of the second disk portion, and when the second disk portion is stacked on the first disk portion, the sheet-like member is pressed by an inner edge of the window to thereby make the sheet-like member protrude from the window.

A second disk portion (16b) is stacked on a first disk portion (16a) to thereby form the disk portion (16). A base (40) is formed on the first disk portion (16a), and the sheet-like member (42) put over the base is pressed by an inner edge (44a) of a window (44) formed on the second disk portion (16b). Thus, the sheet-like member (42) is protruded from the window (44) to thereby rub the lens.

A fifth invention is a lens cleaner according to the first invention, wherein the swelling soft member is affixed on one surface of the disk portion.

In the fifth invention, a sheet of member (10'), for example, is utilized, and on one main surface of the disk portion thereof, a swelling soft member (22) is affixed by an adhesive sheet (122), for example.

A sixth invention is a lens cleaner according to the fifth invention, wherein the swelling soft member includes a base provided at the predetermined position on the main surface of the disk portion and a sheet-like member which is put over the base member so as to cover the same, and the sheet-like member around the base is affixed on the one main surface by an adhesive sheet.

In the sixth invention, by an adhesive sheet (122), the sheet-like member (42) is adhered on the one main surface, and the base (40) is arranged under the sheet-like member (42). Thus, the sheet-like member (42) is protruded from the one main surface of the member (10') in correspondence with the thickness of the base (40).

A seventh invention is a lens cleaner according to claim 6, wherein a recess is formed on the one main surface of the disk portion, and the sheet-like member is affixed on a bottom surface of the recess by the adhesive sheet.

In the seventh invention, a recess (120) is formed on the one main surface of the disk portion, and the swelling soft member, that is, the sheet-like member is arranged inside the recess.

An eighth invention is a lens cleaner used for an optical disk device incorporated with an objective lens, comprising: a disk portion which has a shape capable of being inserted into the optical disk device; a grip which is provided to the disk portion; a base which is provided at a predetermined position corresponding to the objective lens on the main surface of the disk portion; a sheet-like member which is put over the base; and a pressing member which presses the sheet-like member with an outer edge of the base.

In the eighth invention, a lens cleaner (10) has a disk portion (16) of a disk-like shape, for example, and a grip (20) provided thereto. At a predetermined position (position corresponding to the objective lens) on the surface of the disk portion (16), a base (40, 16aA) being made of a soft member, for example, is formed, and a sheet-like member (42) is put over on the base and pressed by the pressing member (44). Thus, in the eighth invention, similar to the first invention, when the lens cleaner is inserted into the optical disk device, and then, the disk is turned with the grip held, the sheet-like member (42) comes into contact with the lens.

A ninth invention is a lens cleaner according to the eighth invention, wherein the pressing member includes a window formed at a position corresponding to the predetermined position, and the sheet-like member is pressed by an inner edge of the window to thereby make the sheet-like member protrude from the window.

In the ninth invention, the pressing member includes a window (44) formed on the disk portion (16), and the sheet-like member (42) is thus pressed by an inner edge (44a) of the window. Thus, the sheet-like member (42) is protruded from the window (44) to thereby rub the lens.

A tenth invention is a lens cleaner used for an optical disk device incorporated with a turntable having a rotating shaft and an objective lens, comprising: a disk portion which has a shape capable of being inserted into the optical disk device; a grip which is provided to the disk portion; a swelling soft member which is provided at a predetermined position corresponding to the objective lens on a main surface of the disk portion, and is able to be brought into contact with the objective lens when the disk portion is inserted into the optical disk device, and a biaser which is provided within an attaching area to be attached to the turntable of the disk portion, and biases the swelling soft member to a side of the objective lens.

In the tenth invention, the lens cleaner (10) has a disk portion (16) of a disk-like shape, for example, and a grip (20) provided thereto. When the user applies a cleaning agent such as alcohol to a swelling soft member (22, 42), and inserts the disk portion into the optical disk device (12) with the grip holding, a chucking mechanism of the optical disk device is actuated to make a chucking by sandwiching the attaching area of the disk portion between a turntable and a damper. At this time, by the biaser (52), the swelling soft member (22) is forcedly biased to the side of the objective lens. Thus, when the user swings the grip (20) right and left, the swelling soft member is more surely brought into contact with the surface of the objective lens.

An eleventh invention is a lens cleaner according to the tenth invention, wherein the biaser includes a spacer which is provided on the main surface of the disk portion so as to be opposed to the swelling soft member with the shaft of the turntable inbetween.

In the eleventh invention, the biaser includes a spacer (52) provided at a predetermined position. When the disk portion is chucked with the turntable, the attaching area (32) of the disk portion is pressed by a damper, but a function by the spacer (52) makes the rear end of the disk portion (16) slightly float. Thus, the swelling soft member (22, 42) which is on the opposite side slightly falls to allow an easy contact with the lens.

A twelfth invention is a lens cleaner according to any one of the first to tenth inventions, wherein the swelling soft member has a smooth mount-like shape.

In the twelfth invention, the swelling soft member (22, 42) is formed in a mount-like shape as a whole, having a side surface being an inclined surface (42a). More specifically, it has an inclination continuously changing from the center to the periphery, and a blunt swelling. Thus, in the ninth invention, the swelling soft member, that is, the cleaning member is configured to take a blunt smooth shape, so that no edge of the swelling soft member is hung at anywhere during cleaning. Accordingly, it is possible to prevent dust from occurring due to the cleaning member itself being worn and the lens from being damaged.

A thirteenth invention is a lens cleaner according to any one of the first to twelfth inventions, further comprising an insertion restraining member which is formed at an outer peripheral edge of the disk portion, and restrains an inserting direction of the disk portion.

In the thirteenth invention, in the embodiment, a protrusion (64, 64) being protruded nearside is formed at a predetermined position of the disk portion (16), for example, on the outer peripheral edge in front of the median line (62) as an insertion restraining member. In a case that the lens cleaner (10) is inserted correctly into the optical disk device (12), that is, in a case that it is inserted straightly, the length of the median line (62) becomes the maximum width of the lens cleaner 10, that is, the disk portion (16), and moreover, the length of the median line is shorter than the width of the slot (14), and therefore, the lens cleaner (10) can be inserted into the optical disk device (12) as it is. However, in a case that it is not inserted straightly, the protrusion (64, 66) protrudes outwardly, and the distance between the outer edge of the protrusion and the outer edge of the disk portion opposed thereto is longer than the aforementioned width of the slot, and therefore, the disk portion (16) is caught by the entrance of the slot (14) and cannot be inserted any more. That is, the protrusion functions as a restraining member for correctly (straightly) inserting the lens cleaner. According to the thirteenth invention, the lens cleaner is always correctly inserted, and therefore, the swelling soft member, that is, the cleaning member is always brought into contact with the objective lens.

A fourteenth invention is a lens cleaner used for an optical disk device incorporated with an objective lens, comprising: a case portion which has a shape capable of being inserted into the optical disk device; a grip; a movable member which is connected to the grip and moves in conjunction with the grip within the case portion; and a swelling soft member which is provided on the movable member, is protruded from a main surface of the case portion, and is able to be brought into contact with the objective lens when the case portion is inserted into the optical disk device.

In the fourteenth invention, a lens cleaner (10) has a case portion (116) having a disk-like shape, for example, and a grip (82, 100). The grip and the movable member (80, 98) are moved in conjunction with each other. The user applies a cleaning agent such as alcohol to a swelling soft member (22, 42), and inserts the case portion into the optical disk device (12) with the grip holding. When the optical disk device detects the insertion of the case portion, a loading mechanism (not illustrated) of the optical disk device is actuated to automatically take the case portion into the interior thereof.

The case portion (116) of the lens cleaner (10) is taken into the interior, then a chucking mechanism (not illustrated) of the optical disk device is actuated to chuck the case portion (116) between a turntable and a clamper at a position corresponding to the aforementioned attaching area. At this time, a swelling soft member (22) exists at the pickup portion, and this makes a reflection factor extremely lower than that of a normal disk, and whereby, the optical disk device does not rotate the loaded object (lens cleaner) at this time.

The user displaces or moves the grip backward and forward or right and left with the case portion inserted into the disk device. In a case that the movable member (80, 98) is provided so as to move along with the grip (82, 100), by moving the grip backward and forward or right and left, the cleaning member (22), that is, the swelling soft member (42) can also be moved backward and forward or right and left. Since the swelling soft member is protruded downward from the case portion, the cleaning member, that is, the swelling soft member moves in contact with a surface of the objective lens, and removes a deposit on the surface of the objective lens.

A fifteenth invention is a lens cleaner according to the fourteenth invention, wherein the movable member can be rotated about a center in common with the case portion within a range of a predetermined angle independent from the case portion.

In the fifteenth invention, an operating member (78), for example, is attached to the case portion (116), and the operating member (78) includes a grip (82) and a movable member (80), for example, which is formed as one piece to be in conjunction with the grip. The operating member is attached to the case portion such that the center of the rotation becomes the center in common with that of the case portion. Accordingly, when the grip (82) is swung right and left, the movable member (80) is also rotated or turned within a predetermined angle range independent of the case portion. Since the swelling soft member is protruded downward from the case portion, the cleaning member, that is, the swelling soft member moves in contact with a surface of the objective lens, and removes a deposit on the surface of the objective lens.

A sixteenth invention is a lens cleaner according to the fourteenth invention, wherein the movable member can be moved backward and forward along an inserting direction of the case portion independent of the case portion.

In the sixteenth invention, for example, an operating member (96) is attached to the case portion (116), and the operating member (96) includes a grip (100) and a movable member (98), for example, which is formed as one piece to be in conjunction with the grip. The operating member is attached to the case portion displaceable in a longitudinal direction. Accordingly, when the grip (100) is displaced longitudinally, that is, backward and forward, the movable member (98) is also displaced or moved along the inserting direction of the case portion independent of the case portion. Since the swelling soft member is protruded downward from the case portion, the cleaning member, that is, the swelling soft member moves in contact with a surface of the objective lens, and removes a deposit on the surface of the objective lens.

A seventeenth invention is a lens cleaner according to any one of the fourteenth to sixteenth inventions, further comprising an insertion restraining member which is formed on an outer peripheral edge of the case portion, and restrains the inserting direction of the case portion.

In the seventeenth invention, an advantage similar to the aforementioned thirteenth invention can be expected.

According to the present invention, the surface of the objective lens is rubbed by the swelling soft member, and therefore, it is possible to surely remove irremovable materials, such as tar of cigarettes and oil.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 12 is an illustrative view showing another embodiment.

FIG. 13 is an illustrative view showing a modified example of FIG. 12 embodiment.

FIG. 15 is an illustrative view showing a lens cleaner manufactured by using FIG. 14 embodiment.

FIG. 16 is an illustrative view showing a still another embodiment, FIG. 16(A) is a plane illustrative view showing an upper layer member, FIG. 16(B) is a plane illustrative view showing a lower layer member, FIG. 16(C) is a cross-sectional view showing the upper layer member and the lower layer member before they are assembled, and FIG. 16(D) is a cross-sectional view showing the lens cleaner formed by inserting a claw of the lower layer member into a through hole of the upper layer member.

FIG. 24 is an illustrative view showing a process of manufacturing the lens cleaner in FIG. 23 embodiment.

FIG. 28 is an illustrative view showing a process of manufacturing the lens cleaner in FIG. 27 embodiment, FIG. 28(A) shows a situation before the upper layer member and the lower layer member are folded, and FIG. 28(B) shows a situation that a middle layer member is set at a predetermined position with both of the layers folded.

FIG. 29 is an illustrative view showing in plan a situation that the lens cleaner in FIG. 27 embodiment is inserted into the optical disk device.

FIG. 30 is a cross-sectional view showing a situation that the lens cleaner in FIG. 27 embodiment cleans the lens.

BEST MODE FOR PRACTICING THE INVENTION

Figure 1:
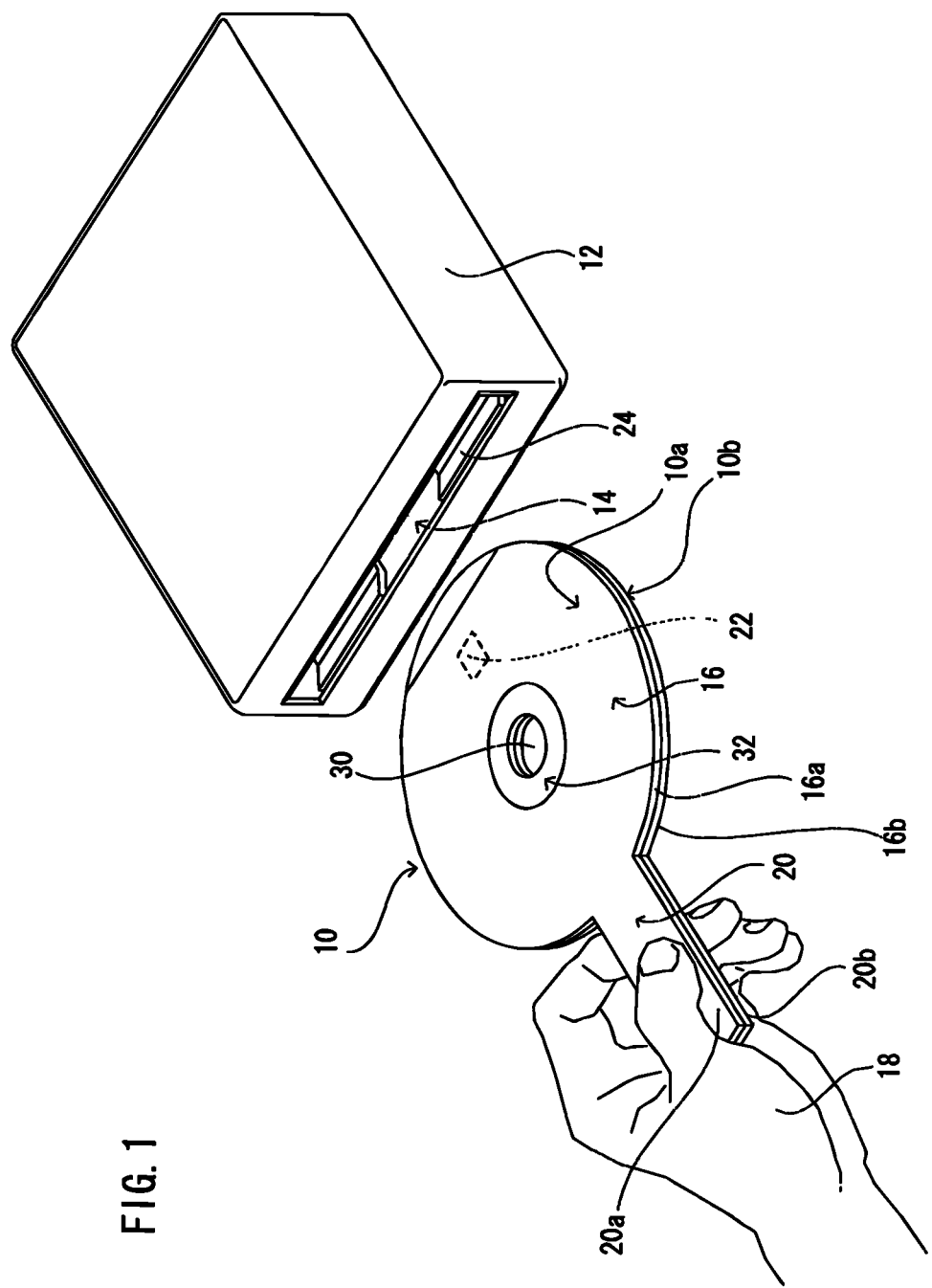
FIG. 1 is an illustrative view showing a lens cleaner of one embodiment of the present invention and usage thereof.

A lens cleaner 10 of one embodiment of the present invention shown in FIG. 1 is provided with a disk portion 16 having a disk-like shape, for example, capable of being inserted into the interior of an optical disk device 12 through a slot 14, and a grip 20 outwardly protruded from an outer edge of the disk portion 16 and capable of being gripped with a hand 18 of human 18. Then, on a bottom surface of the disk portion 16, a cleaning member 22, simply shown by dotted lines in FIG. 1, including a soft member protruded from the bottom surface is formed. Additionally, a shutter 24 is provided to the slot 14 of the optical disk device 12 for, when a normal disk (not illustrated) or the lens cleaner 10 reaches a predetermined position inside the optical disk device 10, rising up to prevent a disk from being inserted any more (double insertion).

Here, the lens cleaner 10 of the embodiment is formed by stacking two sheets of plastic thin plates, such as polycarbonate, chloroethylene, etc., and an upper layer member is denoted by 10a, a lower layer member is denoted by 10b, an upper layer disk portion is denoted by 16a, and a lower layer disk portion is denoted by 16b. Similarly, an upper layer grip is denoted by 20a, and a lower layer grip is denoted by 20b.

The diameter of the disk portion 16 is set to 120 mm, and the thickness thereof is set to 1.2 to 1.5 mm in a case of optical disk devices for a normal CD, DVD or a next-generation DVD, for example. However, there is no need of being restricted to these numerical values, and in a case that a special optical disk device is used, a diameter and a thickness suitable for the optical disk device should be set.

Figure 2:
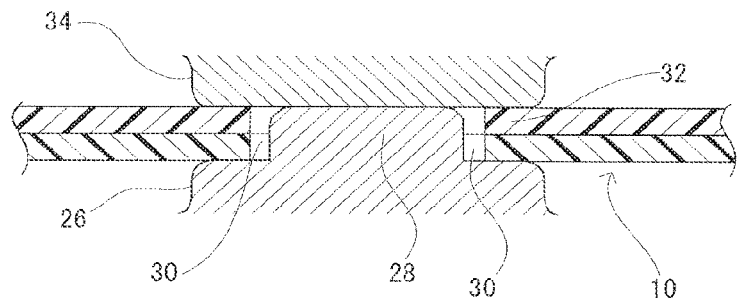
FIG. 2 is an illustrative view showing a situation that the lens cleaner of FIG. 1 embodiment is chucked to a turntable inside an optical disk device.

At the center of the disk portion 16, a through hole 30 to which a shaft 28 of a turntable 26 (both of them is shown in FIG. 2) of the optical disk device 10 is to be inserted during chucking is performed. The disk portion 16 is chucked by the turntable 26 and a damper 34 at a doughnut-shaped area 32 surrounding the central through hole 30 as shown in FIG. 2. That is, the area 32 is an attaching area.

Figure 3A:
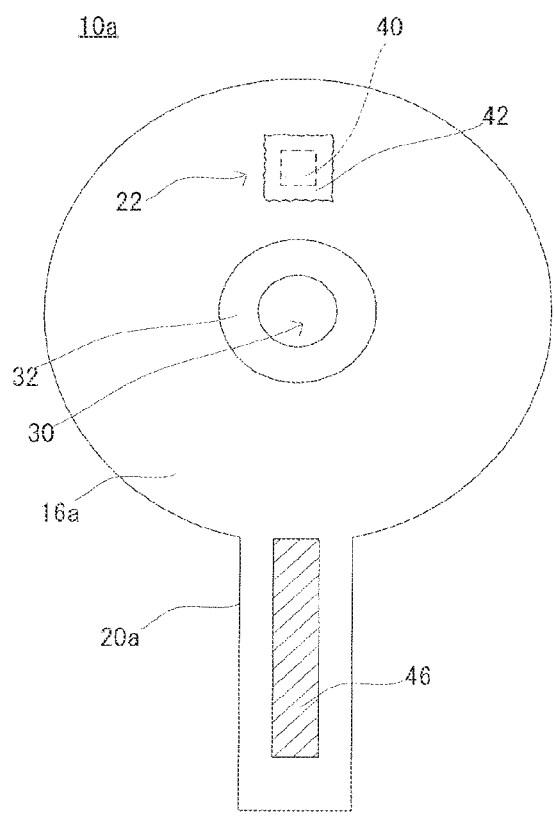
FIG. 3 is an illustrative view showing an upper layer member, a lower layer member and accompaniment thereof for manufacturing the lens of FIG. 1 embodiment.
Figure 3B:
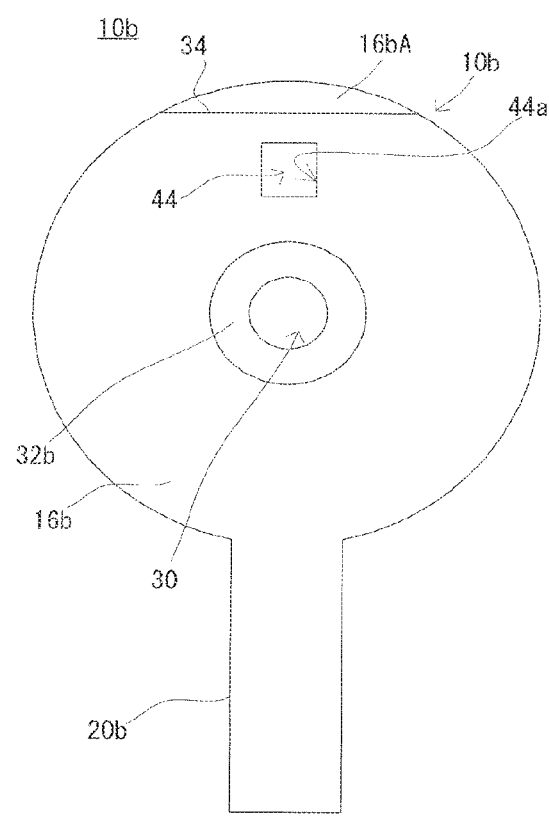

In order to manufacture the lens cleaner 10 of FIG. 1 embodiment, the upper layer member 10a and the lower layer member 10b respectively shown in FIG. 3(A) and FIG. 3(B) are prepared by an proper method, such as a punching forming of a plastic thin plate or an injection molding of plastic, for example. The thickness of each of the members 10a and 10b is set to 0.6 to 0.75 mm. That is, the thickness is set to 1.2 to 1.5 mm with both of the members stacked with each other.

The upper layer member 10a includes the upper layer disk portion 16a and the upper layer grip 20a, and the lower layer member 10b includes the lower layer disk portion 16b and the lower layer grip 20b. At a corresponding central position of the respective disk portions 16a and 16b, the central hole 30 is formed. At a front end of the lower layer disk portion 16b (opposed side to the grip), a folding line 34 is formed at a position a small distance apart from the end. The folding line 34 is formed to be made thin, for example, and at this line, the lower layer disk portion 16b can be folded.

Figure 7:
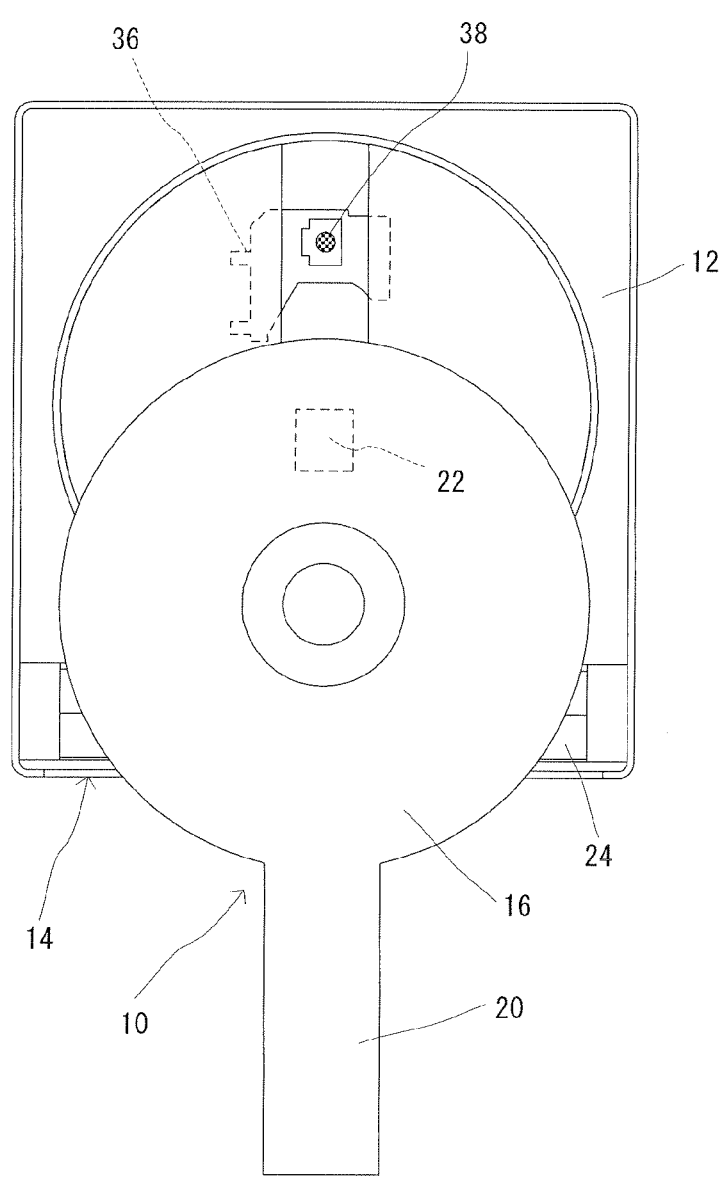
FIG. 7 is an illustrative view showing in plan a progress of loading the lens cleaner of the embodiment into the optical disk device.

At a predetermined position of the upper layer disk portion 16a, that is, a position that corresponds to an objective lens 38 of an pickup 36 (both are shown in FIG. 7) when the lens cleaner 10 is inserted into the optical disk device 12, a cleaning member 22 is provided. The cleaning member 22 is set on a top surface of the upper layer disk portion 16a by an adhesive agent, for example, and includes a base 40 which is made of a soft member, such as a sponge, rubber, and a sheet-like member 42 such as cloth which is put over the base 40 so as to cover it. As a sheet-like member 42, a clothe such as "TORAYSEE" (product name: Toray Co., Ltd.) having fuzzing as little as possible and capable of effectively removing dust is preferable, but this is not required to be restricted thereto, and can employ arbitrary cloth, nonwoven fabric, etc. Additionally, as a soft member utilized for the base 40, one produced by folding a similar cloth may be employed. In addition, the size of the sheet-like member 42 is a size capable of covering at least the entire of the base 40. The sheet-like member 42, that is, the cleaning member 22, however, is retained by sandwiching the sheet-like member extending off the base 40 between the upper layer disk portion 16a and the lower layer disk portion 16b as described later, and therefore, the size is set to have a relatively larger size so as to obtain sufficient retention forces. More specifically, each side of the sheet-like member 42 is set to have in the order of two to four times as large as the corresponding side of the base 40.

At the position corresponding to the aforementioned base 40 and sheet-like member 42 on the lower layer disk portion 16b, a window 44 is formed by a through hole. The size of the window 44 is set such that its inner edge 44a is slightly larger than the outer edge of the base 40.

Furthermore, on a top surface of the upper layer grip 20a, an adhesive layer 46 is formed with a suitable area at a suitable place. The adhesive layer 46 can be formed on the grip 20a by affixing a double-faced adhesive tape on the grip 20a, and then removing a remaining separator. However, by directly applying or printing an adhesive agent thereto, the adhesive layer 46 may be given.

When the lens cleaner 10 shown in FIG. 1 is produced by utilizing the upper layer member 10a and the lower layer member 10b shown in FIG. 3, the above-described base 40 is first affixed at a predetermined position of the upper layer disk portion 16a by utilizing an adhesive agent, for example. Successively, the sheet-like member 42 is put over the base 40.

Figure 4:
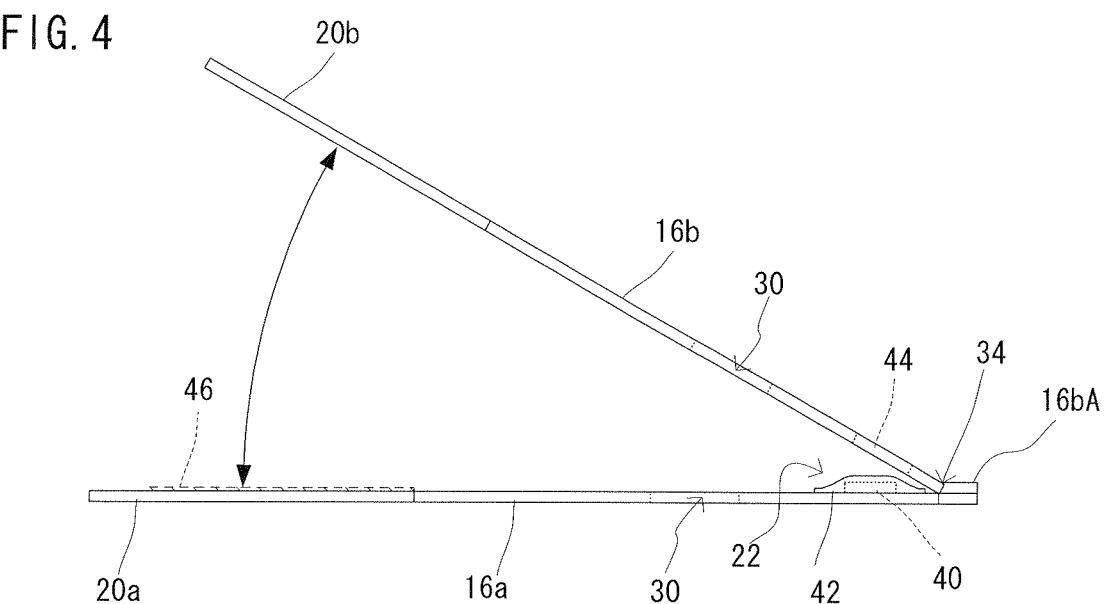
FIG. 4 is a cross-sectional view showing a manufacturing process for completing the lens cleaner of the embodiment by using the upper layer member, the lower layer member, and the accompaniment thereof shown in FIG. 3.

Thereafter, as shown in FIG. 4, a front end portion 16bA nearer the tip end than the folding line 34 of the lower layer disk portion 16b is affixed at a corresponding front end position of the upper layer disk portion 16a by an adhesive agent, for example.

Then, the remaining lower disk portion 16b of the lower layer member 10b (except for the front end portion 16bA) and the lower layer grip 20b are stacked on the upper layer member 10a as shown by an arrow in FIG. 4. Hereupon, by the adhesive layer 46 formed on the upper layer grip 20a, the upper and lower layer grips 20b and 20a are tightly affixed with each other to thereby complete the lens cleaner 10 shown in FIG. 1, that is, FIG. 5.

Figure 6:
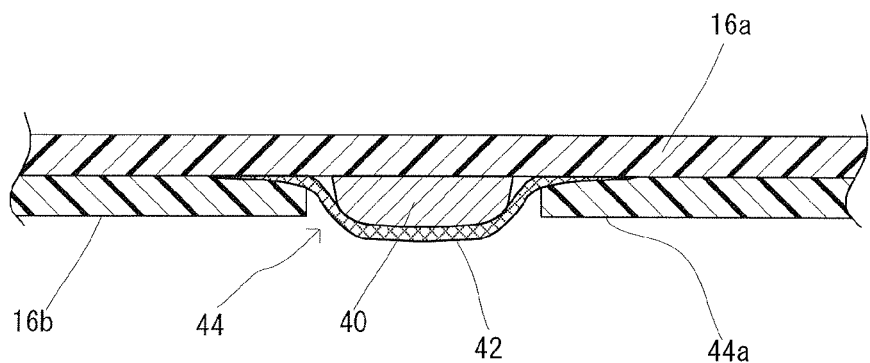
FIG. 6 is a cross-sectional view showing a major part of the lens cleaner of the embodiment.

In the lens cleaner 10, the cleaning member 22 is formed as shown in FIG. 6. That is, the base 40 is affixed on the upper layer disk portion 16a, and the sheet-like member 42 is put over them. Thereafter, the lower layer disk portion 16b is stacked to be adhered to the upper layer disk portion 16b.

The lower layer disk portion 16b is formed with the window 44 which is slightly larger than the base 40 at a position corresponding to the base 40. When the lower layer disk portion 16b is closely adhered with the upper layer disk portion 16b, the sheet-like member 42 which is put over the base 40 is pressed by the inner edge 44a of the window 44 at the outward position of the base 40, and is sandwiched between the lower layer disk portion 16b and the upper layer disk portion 16a, Thus, the sheet-like member 42 is retained.

At this time, as shown in FIG. 6, the sheet-like member 42 rises up by the thickness of the base 40, is protruded from the window 44 of the lower layer disk portion 16b, specifically, protruded over a top surface of the lower layer disk portion 16b. Also, the sheet-like member 42 around the base 40 is pulled by the lower layer disk portion 16b and the upper layer disk portion 16a to thereby take a swelling mount-like shape.

More specifically, as shown in FIG. 6, the sheet-like member 42 forms a blunt swelling having an inclination 42a continuously changing from the center to the periphery. In a case that the base 40 is an elastic member, the base 40 is compressed at its edge by a pressure from the sheet-like member 42 to deform to a swelling mount-like shape as well. Thus, the cleaning member takes a blunt smooth shape, so that it is possible to prevent useless force being imparted due to the edge of the base 40 being caught, etc. and prevent dirt due to the sheet-like member 42 being frayed, and damage to the lens from occurring.

Figure 8:
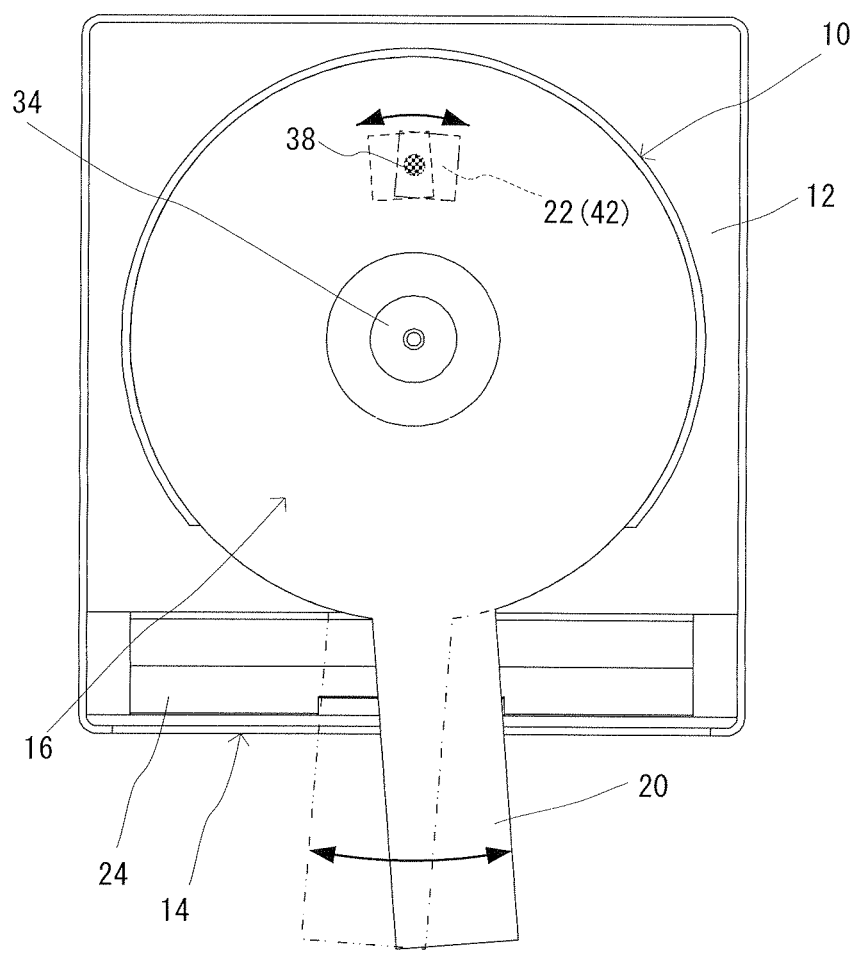
FIG. 8 is an illustrative view showing in plan a situation that the lens cleaner of the embodiment is inserted into the optical disk device.

In a case that the lens 38 (FIG. 7) of the optical disk device 10 is cleaned by utilizing the lens cleaner 10 thus completed, a cleaning agent, such as alcohol is applied to the cleaning member 22, that is, the sheet-like member 42, and the lens cleaner 10 is inserted from the slot 14 into the interior of the optical disk device 10 with the grip 20 hold as shown in FIG. 1. At this time, when the insertion of the lens cleaner 10 is detected by a shutter sensor (not illustrated) provided at the slot 14 of the optical disk device 12 or in the vicinity thereof, a loading mechanism (not illustrated) of the optical disk device 12 is actuated to automatically take the lens cleaner 10 into the interior as shown in FIG. 8.

After the lens cleaner 10 is taken in the interior, a chucking mechanism (not illustrated) of the optical disk device 12 is actuated to perform chucking by inserting the rotating shaft 28 into the central hole 30 of the lens cleaner 10 and sandwiching the attaching area 32 of the lens cleaner 10 between the turntable 26 and the clamper 34 as shown in FIG. 2. This is a state that the lens cleaner is fixed on the turntable by the damper 34.

Next, a laser beam is irradiated from the pickup 36 (FIG. 7), and the computer (not illustrated) determines what is the loaded disk, that is, whether a normal disk or the lens cleaner 10 by the reflected light incident to the pickup 36 (reflection factor thereof). In a case of the normal disk, the reflected light incidents at a normal reflection factor, so that the computer of the optical disk device 12 determines that the loaded disk at this time is a normal disk to actuate a spindle motor not shown and execute reproducing/recording of the disk by executing focusing processing.

In a case of the lens cleaner 10, the cleaning member 22, that is, the sheet-like member 42 exists at the pickup 36, and therefore, the reflection factor is extremely lower than that of the normal disk. Accordingly, the computer of the optical disk device 12 does not determine that the loaded disk at this time is a normal disk, and does not rotate the disk. Accordingly, the focusing operation is also not performed.

In the state shown in FIG. 8, the user swings the grip 20 right and left. It should be noted that in a case that a shutter 24 is provided to the slot 14, a swingable range of the grip 20 is restricted or restrained to a central portion of the shutter 24.

The lens cleaner 10 is fixed on the turntable in a rotatable state. Thus, when the grip 20 is swung right and left, the lens cleaner 10, that is, the cleaning member 22 is turned as shown by an arrow in FIG. 8. As described before, the cleaning member, that is, the sheet-like member 42 is downwardly protruded below the lower layer disk portion 16b, so that in correspondence with the turning or rotation of the lens cleaner 10, the sheet-like member 42 moves (rubs) in contact with a surface of the objective lens 38. Accordingly, the deposit on the surface of the objective lens 38 is removed by the sheet-like member 42. While being supported by the base 40, the sheet-like member 42 moves while its large area comes into contact with the objective lens 38, and therefore, even if the deposit is an irremovable material, such as tar of cigarettes and oil which cannot be removed by a conventional brush, it is possible to surely remove it. In this case, the sheet-like member 42 is tightly retained by the two disk portions 16a and 16b and never drops undesirably during cleaning.

In addition, in this embodiment, the sheet-like member 42 is merely retained by being sandwiched between the upper layer disk portion 16a and the lower layer disk portion 16b, and therefore, when the sheet-like member 42 is made dirty, this can be replaced with new one.

In a case of replacement of the sheet-like member 42, the adhered state between the upper layer grip 20a and the lower layer grip 20b by the adhesive layer 46 is released to open the upper layer member 10a (upper layer disk portion 16a) and the lower layer member 10b (lower layer disk portion 16b) as shown in FIG. 4. Then, in this opened state, an old sheet-like member is removed, a new sheet-like member is put on the base 40, and thereafter, the grips 20a and 20b are adhered by the adhesive layer 46 as described before and whereby, the lens cleaner 10 containing the new sheet-like member can be obtained.

It should be noted that in the previous embodiment, the adhesive layer 46 is formed on the upper layer grip 20a, but this may be formed on the surface of the lower layer grip 20b, or formed on both sides thereof. In addition, such an adhesive layer may be applied to the disk portions 16a and/or 16b. If the adhesive layer is set to the disk portion, an adhesive force between the disk portions 16a and 16b is enhanced to more tightly retain the sheet-like member 42 in comparison to a case that the adhesive layer is set to only the grip. Accordingly, it is possible to more reduce a possibility of dropping the sheet-like member 42 during cleaning.

Figure 9:
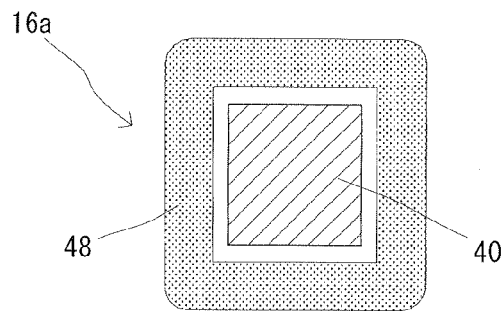
FIG. 9 is an illustrative view showing a major part of another embodiment.
Figure 10:
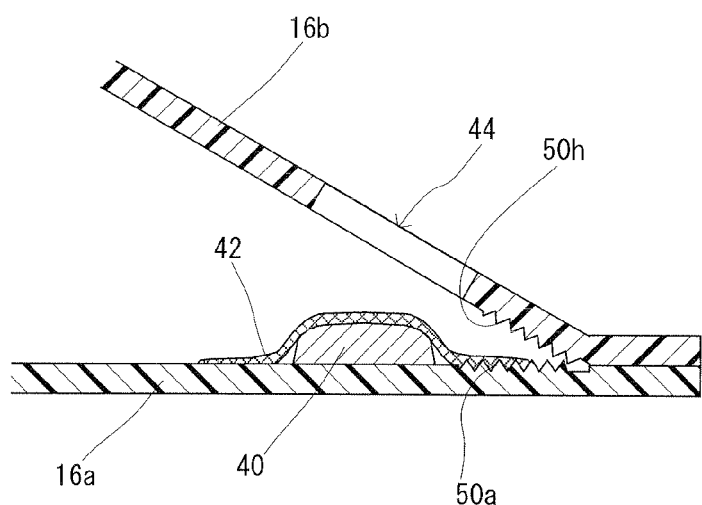
FIG. 10 is an illustrative view showing a major part of a still another embodiment.

In order to more securely retain the sheet-like member 42, embodiments shown in FIG. 9 or FIG. 10 is conceivable.

In FIG. 9 embodiment, around the portion affixed with the base 40, an adhesive layer 48 is formed so as to surround the base 40 on the upper layer disk portion 16a. The sheet-like member (not illustrated here) which lies off the base 40 is captured by the adhesive layer 48, so that the sheet-like member is more tightly retained between the disk portions 16a and 16b coupled with a sandwiching force between the disk portions 16a and 16b. Thus, it is possible to more reduce the probability of dropping the sheet-like member during cleaning.

In FIG. 9 embodiment, since the sheet-like member 42 can be temporarily kept over the base 40, in the process of bringing the lower layer disk portion 16b closely contact with the upper layer disk portion 16a shown in FIG. 4, this has an advantage of saving inconvenience of the sheet-like member 42 being detached from the base 40.

In FIG. 10 embodiment, a roughened surface portion 50a is formed so as to surround the base 40 at the portion affixed with the base 40 on the upper layer disk portion 16a, and a similar roughened surface portion 50b is formed at a corresponding position on the lower layer disk portion 16b. The sheet-like member 42 which lies off the base 40 is captured by the two roughened surface portions 50a and 50b, so that the sheet-like member can be more tightly retained between the disk portions 16a and 16b coupled with a sandwiching force between the disk portions 16a and 16b. Accordingly, similar to FIG. 9, it is possible to more reduce the probability of dropping the sheet-like member during cleaning.

In the previous embodiments, the base 40 being made of the soft member is affixed on the upper layer disk portion 16a by an adhesive agent. However, the base 40 need not be a soft member so long as it does not lose a function of making the sheet-like member 42 protrude from the surface of the lower layer disk portion 16b. This is because in a case that the sheet-like member put over the base is a soft member, such as a cloth, even though the base 40 is hard, there is no fear that the sheet-like member 42 damages the lens 38.

Figure 11:
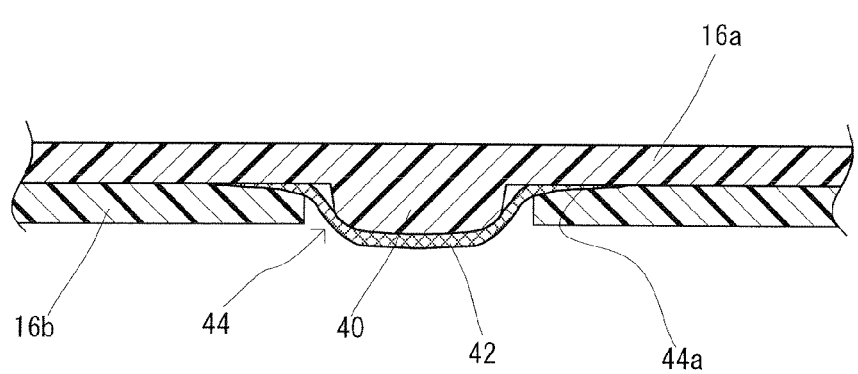
FIG. 11 is an illustrative view showing a major part of a further embodiment.

If the base may not be a soft member, the portion corresponding to the base may be integrally formed with the disk portion 16a as a flat protrusion 16aA on the upper layer disk portion 16a as shown in FIG. 11. According to this embodiment, it is free from a troublesome work of affixing the base 40 on the disk portion 16a.

Figure 5:
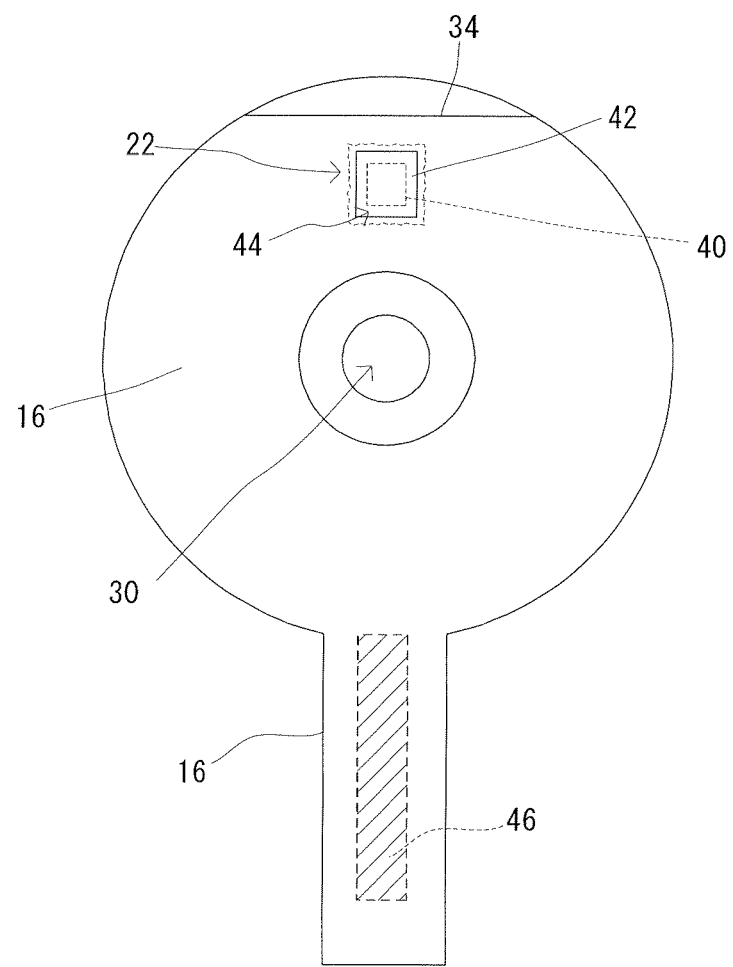
FIG. 5 is an illustrative view showing a completed lens cleaner in plan.

In addition, in the above-described embodiment, by utilizing the upper layer member 10a shown in FIG. 3 and the lower layer member 10b prepared separately therefrom, the lens cleaner 10 shown in FIG. 5 is completed through the process shown in FIG. 4. However, the upper layer member 10a and the lower layer member 10b may be prepared as one piece connected at an extremely narrow connecting portion 10c as shown in FIG. 12. This embodiment has an advantage of producing the upper layer member 10a and the lower layer member 10b at a time (whether punching molding or injection molding). In this embodiment as well, the upper layer member 10a and the lower layer member 10b are respectively formed with the disk portions 16a and 16b, and the grips 20a and 20b, and the lower layer disk portion 16b is further provided with the folding line 34 and the window 44.

In FIG. 12 embodiment, the adhesive layer 46 which is formed on the upper layer grip 20a in the above-described embodiment is formed on the upper layer disk portion 16a.

In FIG. 12 embodiment, after the cleaning member 22, that is, the base 40 and the sheet-like member 42 are set on the upper layer disk portion 16a of the upper layer member 10a, a front end portion 16bA nearer the tip end than the folding line 34 of the lower layer disk portion 16b is affixed on the upper layer disk portion 16a to bring the lower layer disk portion 16b closely contact with the upper layer disk portion 16a. The both of the portions 16a and 16bb are affixed with the adhesive layer 46 to complete the lens cleaner 10 shown in FIG. 5.

As a modified example of FIG. 12, FIG. 13 embodiment is conceivable. In FIG. 13 embodiment, the lower layer member 10b of FIG. 12 embodiment is modified. More specifically, the lower layer member 10b of this embodiment includes a rectangular portion 16bb having a length corresponding to the diameter of the lower layer disk portion 16b in FIG. 12 and the lower layer grip 20b extending outwardly from the end of the rectangular portion 16bb. The rectangular portion 16bb is formed with the through hole 30, the folding line 34 and the window 44 at respectively corresponding positions to the positions of the lower layer disk portion.

In FIG. 13 embodiment as well, after the cleaning member 22 is set on the upper layer disk portion 16a of the upper layer member 10a, the front end portion 16bA of the lower layer member 10b is affixed on the upper layer disk portion 16a to bring the rectangular portion 16bb into contact with the upper layer disk portion 16a. The both portions 16a and 16bb are affixed by the adhesive layer 46 to thereby complete the lens cleaner. In this embodiment, the size of the upper layer member 10b is set to a minimum required amount, and thus, there is an advantage of saving in material costs.

Figure 14:
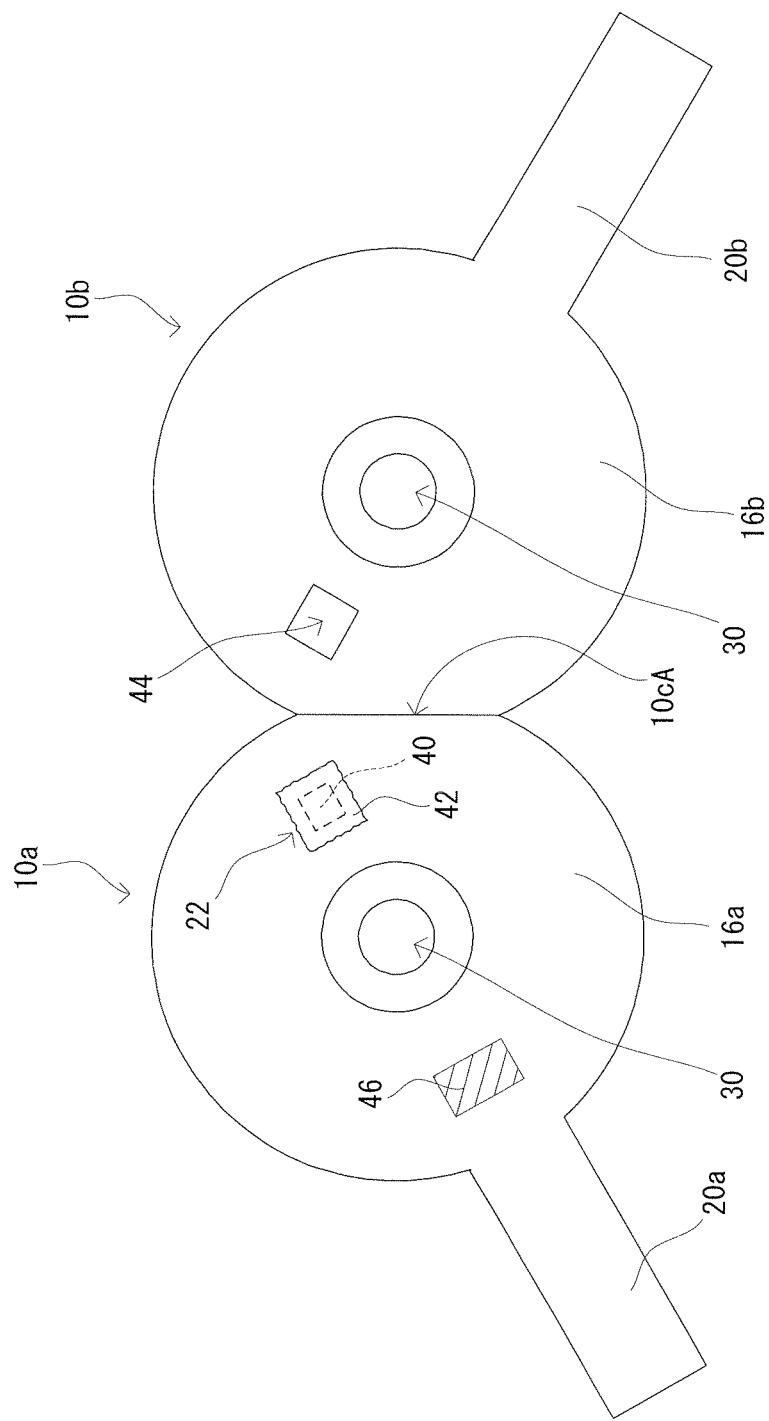
FIG. 14 is an illustrative view showing another embodiment.

FIG. 14 embodiment is also considered to be a modification of FIG. 12. In FIG. 12 embodiment, the upper layer member 10a and the lower layer member 10b are prepared as one piece to be connected at the connecting portion 10cA at the front end of the disk portion. In FIG. 12 embodiment, the pieces are not separated one from another, so that this has an advantage of being easy to handle and manage, but the width of the connecting portion 10c is narrow to make the connecting portion 10 easily distort in the width direction, so that this has an attendant difficulty in correctly stacking the both of the members 10a and 10b. FIG. 14 embodiment implements a more easy production of the lens cleaner while affording an advantage owing to the integrated configuration.

In FIG. 14 as well, the upper layer member 10a and the lower layer member 10b are regarded as one piece, but in this embodiment, a connecting portion 10cA is formed in a relatively long straight line being inclined rightward not at the front end of the disk portion 16 at a position except for the front end. If such a long straight connecting portion is formed at the front end of the disk portion, the disk portion results in a truncated-end shape for which the front end of the disk portion is cut out at the straight connecting portion. On the other hand, in the optical disk device 12, a trigger lever (not illustrated) is generally faced with a disk insertion portion, and when a disk is loaded, the disk is taken in with the front end of the disk pressing the trigger lever, and when the disk completely presses the trigger lever, it is determined that carrying of the disk for loading is ended. If the front end of the disk portion of the lens cleaner is a cut-out truncated shape, the trigger lever cannot be completely pressed with the end of the disk, so that it becomes impossible to detect carrying of the disk to a predetermined position. From this reason, in FIG. 14 embodiment, the straight connecting portion 10cA is obliquely set to be displaced to the right direction (this may be set to the left direction depending on the position of the trigger lever.) such that the front end of the disk portion is not cut away.

By utilizing the one piece shown in FIG. 14 embodiment, the lens cleaner 10 completed according to the process similar to the aforementioned process is shown in FIG. 15. In this embodiment, the lens cleaner is the same as that in FIG. 5 except that a part of the disk portion 16 is cut out by the connecting portion 10cA. In this embodiment, there is no cut-out portion at the end of the disk portion 16, and therefore, it is possible to completely press the trigger lever. If the trigger lever is arranged at a position displaced toward the cutout portion, the cutout portion need to be made small so as completely press the trigger lever. That is, the cutout portion need to be formed such that a part of which comes into contact with the trigger lever remains.

Additionally, the upper layer member 10a shown in FIG. 16(A) and the lower layer member 10b shown in FIG. 16(B) may be made up of separate two sheet of members, and may be connected by a claw 52 formed at the front end of the lower layer member 10b and a through hole 54 formed at a corresponding position of the upper layer member 10a. Explaining in detail, in FIG. 16 embodiment, the lower layer member 10b includes the lower layer disk portion 16b having a truncated-end disk-like shape and the grip 20b extending therefrom, and the disk portion 16b is formed with the central hole 30. The lower layer disk portion 16b is cut out at the position of the folding line 34 (FIG. 5, etc.) as in the previous embodiment to take a truncated-end disk-like shape, and has two claws 52 projected from the cut-out end. Here, the claws 52 are actually integrally formed with the disk portion 16b.

The upper layer member 10a includes the upper layer disk portion 16a and the grip 20a extending therefrom, and the upper layer disk portion 16a is also formed with the central hole 30. The upper layer member 10a is formed with two transversely-elongated slots 54 at positions corresponding to the two claws 52 of the lower layer disk portion 16b. The vertical length, that is, the width of the through hole 54 sets to be equal to the projecting length, that is, the width of the claw 52.

At the front end portion of the through hole 54 of the upper layer disk portion 16a, a cover 56 which covers approximately half of the aforementioned width of the through hole 54 is affixed by an adhesive agent, for example. Accordingly, the through hole 54 whose width is covered by the cover 56 by half is formed to have a hook-shaped cross-section as shown in FIG. 16(C). In correspondence therewith, the claw 52 of the lower layer member 16b has a hook shape in cross section as shown in FIG. 16(C).

Such the upper layer member 10a and the lower layer member 10b can be formed by injection molding.

A second step of producing the lens cleaner 10 by utilizing the upper layer member 10a and the lower layer member 10b is, similar to the previous embodiments, to put the sheet-like member 42 over the base 40 to temporarily form the cleaning member, that is, the swelling soft member 22, and to insert the claws 52 of the lower layer member 16b into the through holes 54 from near side to make the tip ends of the claws 52 below the cover 56 as shown in FIG. 16(D). Then, the near side of the lower layer member 10b is adhered to the upper layer member 10a such that the upper and lower layer disk portions 16a and 16mb and the grips 20a and 20b are closely brought into contact with each other. At this time, if the adhesive layer 46 (FIG. 3, FIG. 12, etc.) is set, the contact state of the upper layer member 10a and the lower layer member 10b is maintained.

Here, the fact that the sheet-like member 42 (cleaning member 22) is pressed by the inner edge 44a of the window 44 of the lower layer disk portion 16b to make the sheet-like member 42 protrude from the window 44 is the same as that in the aforementioned embodiments.

Additionally, in FIG. 16 embodiment as well, as shown in FIG. 16(D), by utilizing a tape 58, the part that the claws 52 are inserted into the through holes 54 may be covered. That is, if the tape 58 is stretched across the cover 56 and the lower layer disk portion 16b to cover the through holes 54, it is possible to prevent the claws 52 from being detached from the through holes 54. As a tape 58, one applied with a tackiness agent or an adhesive agent on the reverse side, such as a vinyl tape, a metal (foil) tape, etc. can be utilized.

Figure 17:
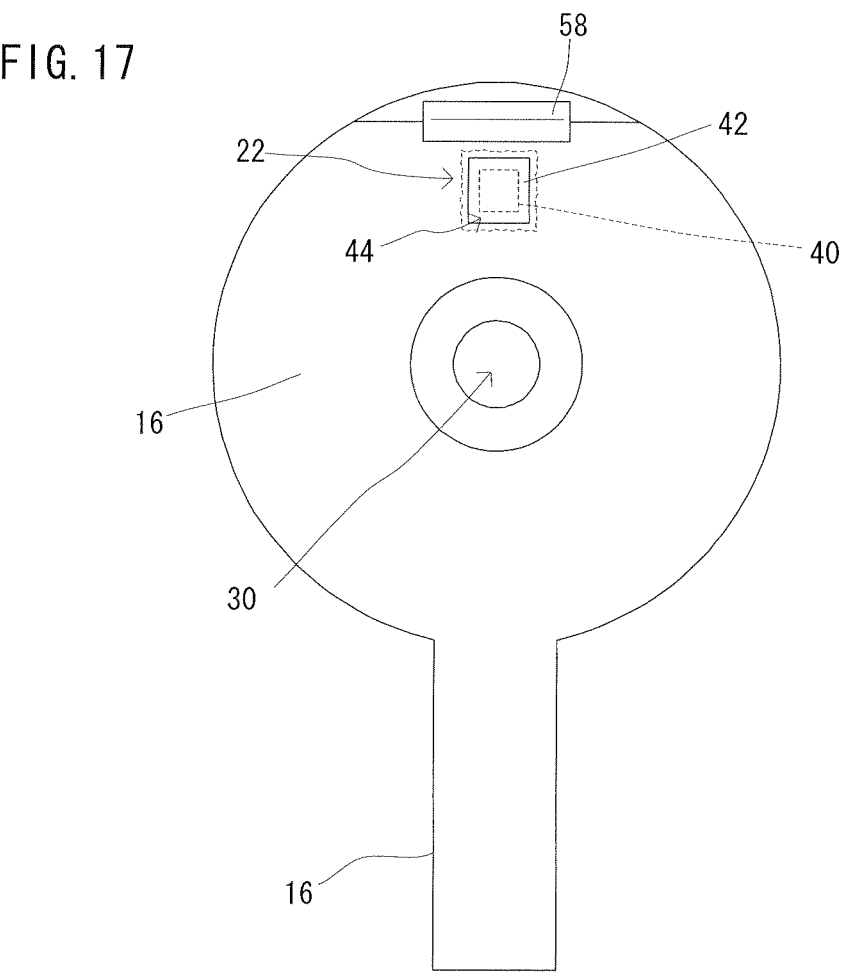
FIG. 17 is a plane illustrative view showing a further another embodiment.

If the tape 58 as described above is used, a next embodiment shown in FIG. 17 is also conceivable. FIG. 17 embodiment is a modification of FIG. 16 embodiment, and uses the upper layer member 10a and the lower layer member 10b which are short of the claw 52, through hole 54 and cover 56 in comparison with FIG. 16 embodiment. Then, the two members 10a and 10b are arranged to be brought into closely contact with each other such that the inner edge of the window 44 presses the fringe of the sheet-like member 42, and by stretching the tape 58 over the end of the upper layer disk portion 16a and the end of the lower layer disk portion 16b, the lower layer member 10b can be attached to the upper layer member 10a so as to be openable or detachable with respect to the upper layer member 10a.

Figure 18:
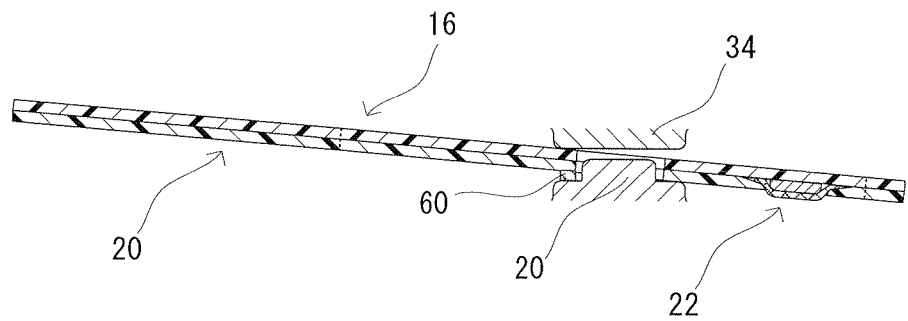
FIG. 18 is an illustrative view showing another embodiment.

FIG. 18 is an illustrative view showing a major part of another embodiment of the present invention, and shows a situation that the lens cleaner 10 is chucked to the turntable 26 of the optical disk device.

In FIG. 18 embodiment, a spacer 60 is formed on the top surface of the lower layer disk portion 16b within the attaching area 32 around the central hole 30 of the lens cleaner 10. The spacer 60 may be integrally formed with the lower layer disk portion 16b, or may be attached to it after being formed separately from the lower layer disk portion 16b. Here, the spacer 60 need to be provided at a determined place within the range of the attaching area 32. That is, the spacer 60 is provided to the opposite (reverse) side to the cleaning member 22 within the attaching area 32 with the central hole 30 in-between.

When the lens cleaner 10 formed with the spacer 60 is chucked onto the turntable 26, by an operation of the spacer 60, the side of the grip 20 (rear side) of the lens cleaner 10 floats up higher than a top surface of the turntable 26 shown in FIG. 18. The fact that the rear side of the lens cleaner 10 floats up higher than the top surface of the turntable 26 means that the front end of the lens cleaner 10 falls lower than the top surface of the turntable 26. The cleaning member 22 (sheet-like member 42) protrudes downward at the front end, and thus, the cleaning member 22 is more close to the objective lens 38 (FIG. 7), and it is possible to expect advantages of surely performing lens cleaning by the lens cleaner 10.

Here, in the above-described embodiments, explained is that the disk portions 16a, 16b and the grips 20a, 20b are formed in one piece. However, the grips 20a, 20b may be separately provided from the disk portions 16a, 16b. This makes it possible to utilize a defective piece and a used disk which are produced during the process of manufacturing the disks for the lens cleaner 10. That is, such a disk may be worked or formed as disk portions 16a and 16b shown in FIG. 3(A) and FIG. 3(B) for example, and grips separately prepared may be attached to these disk portions.

Figure 19:
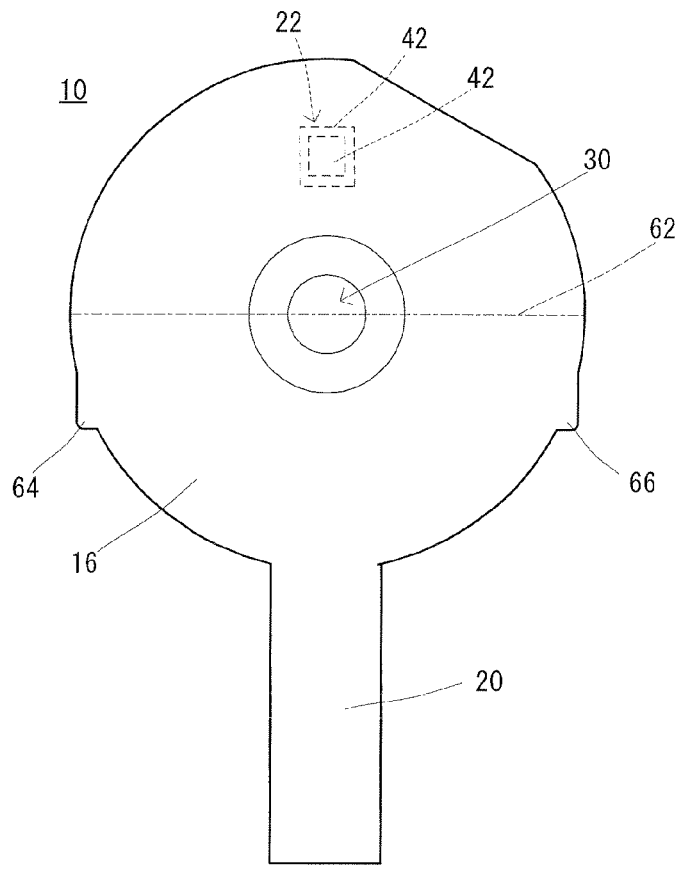
FIG. 19 is an illustrative view showing a major part of a still another embodiment of this invention.
Figure 20:
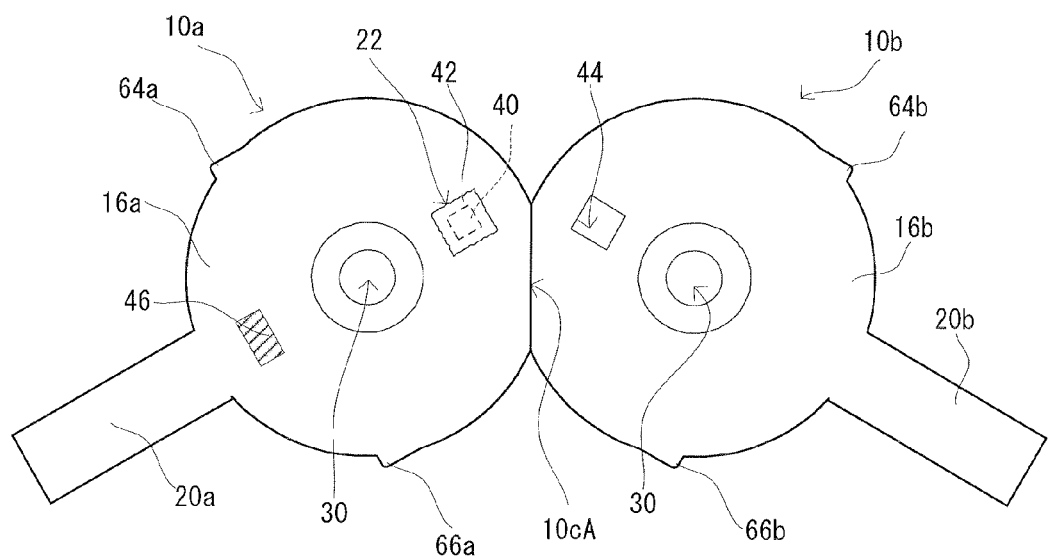
FIG. 20 is an illustrative view showing a process of manufacturing the lens cleaner shown in FIG. 19, and shows a situation before the upper layer member and the lower layer member are folded.

FIG. 19 and FIG. 20 shows a lens cleaner 10 being a still another embodiment of the present invention. The lens cleaner 10 of this embodiment is a modified example of FIG. 14 embodiment. That is, in this embodiment also, the lens cleaner 10 is formed by the upper layer member 10a and the lower layer member 10b which are foldable at the connecting portion 10cA. The upper layer member 10a includes the upper layer disk portion 16a and the upper layer grip 20a straightly outwardly extending from the rear end thereof. At the predetermined position of the upper layer disk portion 16a, the cleaning member 22 including the base 40 and the sheet-like member 42 for covering the base 40 is secured, and the viscous layer or adhesive layer 46 is formed. The lower layer member 10b includes the lower layer disk portion 16b and the lower layer grip 20b straightly outwardly extending from the rear end thereof. At a predetermined position of the lower layer disk portion 16b, the window 44 is formed at a position corresponding to the cleaning member 22. Accordingly, the cleaning member 22 is provided to the upper layer disk portion 16a, then, the upper layer member 10a and the lower layer member 10b are folded at the connecting portion 10cA and stacked, and are tightly affixed with each other by the viscous layer or adhesive layer 46, whereby, the lens cleaner 10 similar to that in FIG. 14 is completed. According to the lens cleaner 10 of this embodiment, an advantage obtained by the lens cleaner 10 in FIG. 14 embodiment can be obtained as it is.

It should be noted that in the lens cleaner 10 shown in FIG. 19 and FIG. 20, in contrast with the lens cleaner in FIG. 14 embodiment, protrusions 64 and 66 protruding backward at the back of the median line 62 (side of the grip 20) on both sides of the disk portion 16 are formed. Here, the median line 62 can be defined as a straight line extending abeam and passing through the center of the central hole 30 of the disk portion 16. In other words, this can be defined as a line passing through the center of the disk portion 16, and in parallel with a straight line 14a defining the entrance of the slot 14 of the optical disk device 12 shown in FIG. 21. The protrusions 64 and 66 which protrude backward, have a shape and a size to such an extent that they are not out of the median line 62. That is, the distance or the length between the outer edges of the protrusions 64 and 66 is designed so as not to exceed the length of the median line 62.

For such the protrusions 64 and 66, protrusions 64a and 66a are formed at relevant positions of the upper layer member 16a, and protrusions 64b and 66b are formed at relevant positions of the lower layer member 16b as shown in FIG. 20. Then, the upper layer member 10a and the lower layer member 10b are stacked to integrally form the protrusions 64 and 66.

Figure 21:
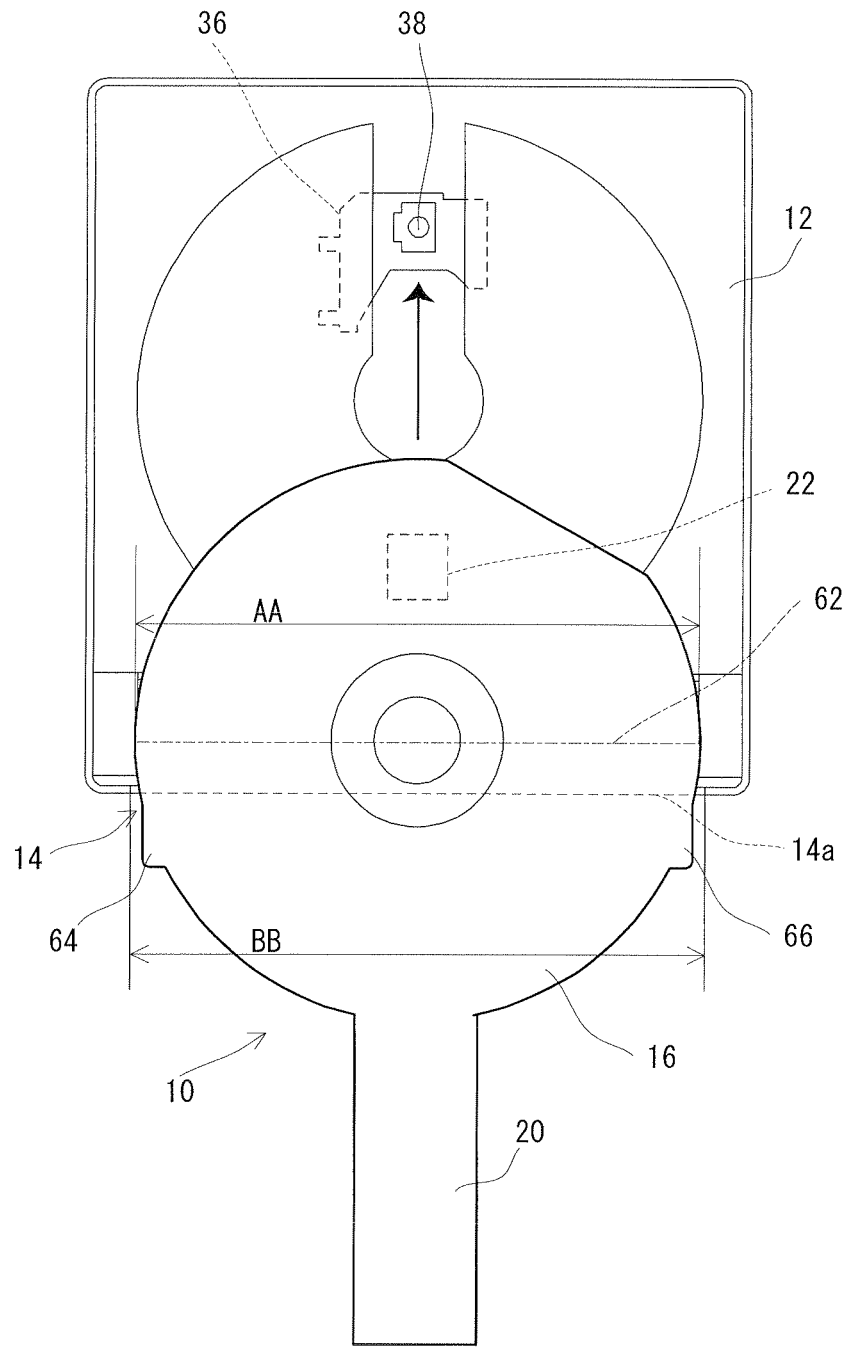
FIG. 21 is an illustrative view showing in plan a situation that the lens cleaner in FIG. 19 embodiment is inserted into the optical disk device and a case that an insertion is correctly performed.

When the lens cleaner 10 in FIG. 19 and FIG. 20 embodiment is inserted into the optical disk device 12, in a case that it is inserted correctly as shown in FIG. 21, that is, in a case that it is inserted straightly, the length of the median line 62 at this time becomes the maximum width of the lens cleaner 10, and the length AA of the median line 62, that is, the maximum width at this time is smaller than the width BB of the slot 14, and therefore, the lens cleaner 10 can be inserted into the optical disk device 12 as it is.

Figure 22:
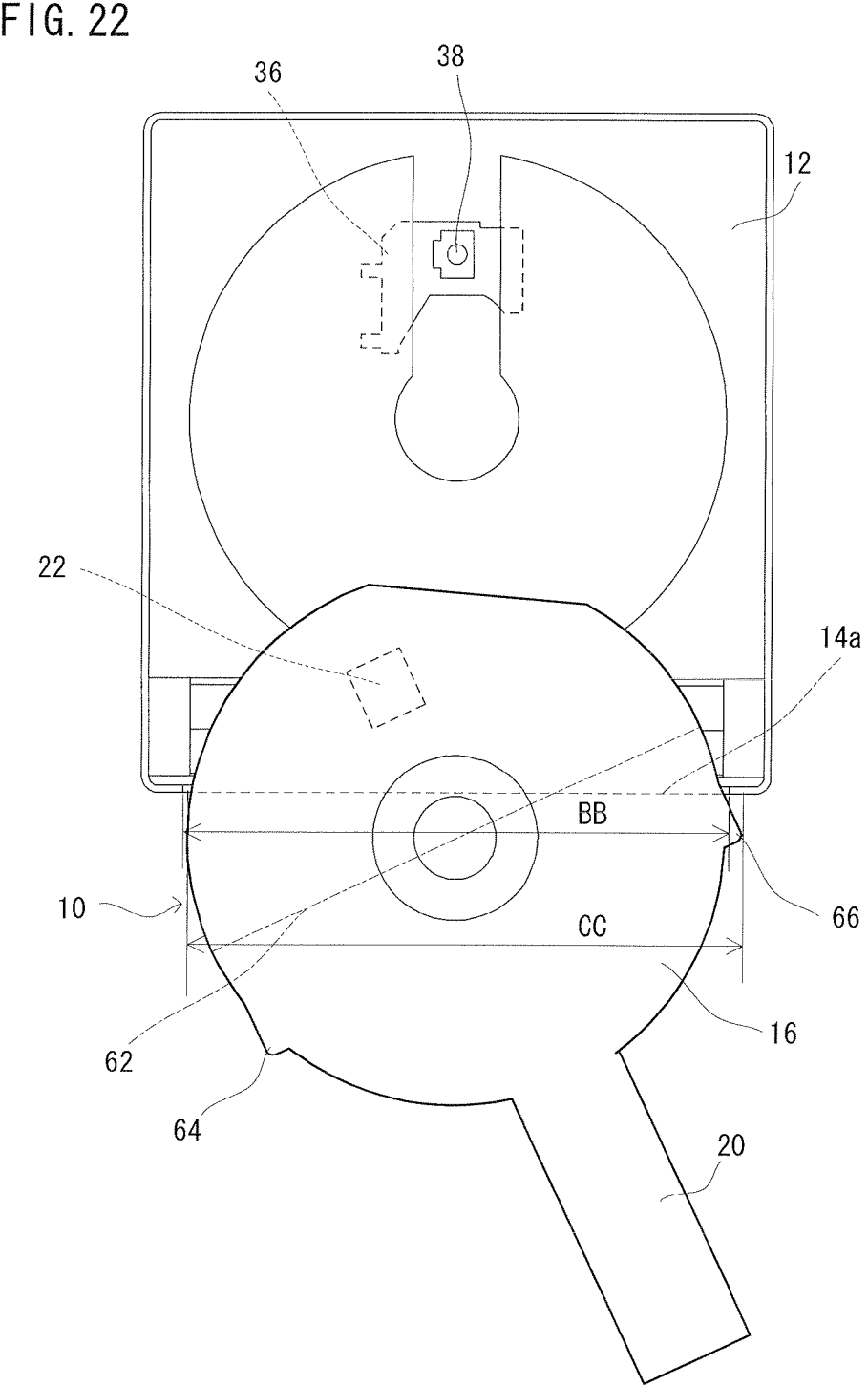
FIG. 22 is an illustrative view showing in plan a situation that the lens cleaner in FIG. 19 embodiment is inserted into the optical disk device and a case that an insertion is incorrectly performed.

However, in a case that the lens cleaner 10 is inserted incorrectly as shown in FIG. 22, that is, in a case that it is inserted with the grip 20 swung right and left (inclined state), the protrusion 66 protrudes outwardly, and the distance or length CC between the outer edge of the protrusion 66 and the outer edge of the disk portion 16 opposed thereto is larger than the width BB of the aforementioned slot 14 (CC>BB), and therefore, the disk portion 16 is caught by the entrance of the slot 14 and cannot be inserted any more. That is, the protrusions 64 and 66 function as a restraining member for correctly (straightly) inserting the lens cleaner 10. Thus, according to this embodiment, the lens cleaner 10 is always correctly inserted, and therefore, the cleaning member 22 have the advantage of being surely contact with the objective lens 38 of the optical pickup 36 when the lens cleaner 10 is inserted into the optical disk device 12. Furthermore, at a time of an operation after the lens cleaner 10 is inserted, the protrusions 64 and 66 come in contact with the inner wall of the drive to thereby restrain a range of movement of the lens cleaner 10, so that a range of movement of the cleaning member 22 is restricted to the surroundings of the objective lens 38. Thus, it is possible to prevent the cleaning member 22 from making the lens dirty again by sweeping the dust settled on the bottom of the drive, etc.

It should be noted that the protrusions 64 and 66 in this embodiment are provided in embodiments to be described in the future, and similarly function as an insertion restraining member. However, it is pointed out here that although additional illustrations are omitted, the protrusions 64 and 66 can be equally applied to the embodiments explained before FIG. 18 as necessary, and play an equivalent function.

Furthermore, the protrusions 64a, 66a and 64b, 66b are provided to the upper layer member 10a and the lower layer member 10b, that is, the disk portions 16a and 16b, but it is conceivable that the protrusions 64a, 66a or 64b, 66b may be provided to only any one of the disk portions 16a and 16b, and one of the protrusion 64a and 66a is formed on the disk portion 16a, and the other of the protrusions 64a and 66a may be formed on the disk portion 16b. That is, with respect to the disk portions 16a and 16b, at least one protrusion on either sides play a sufficient function as an insertion restraining member.

Figure 23:
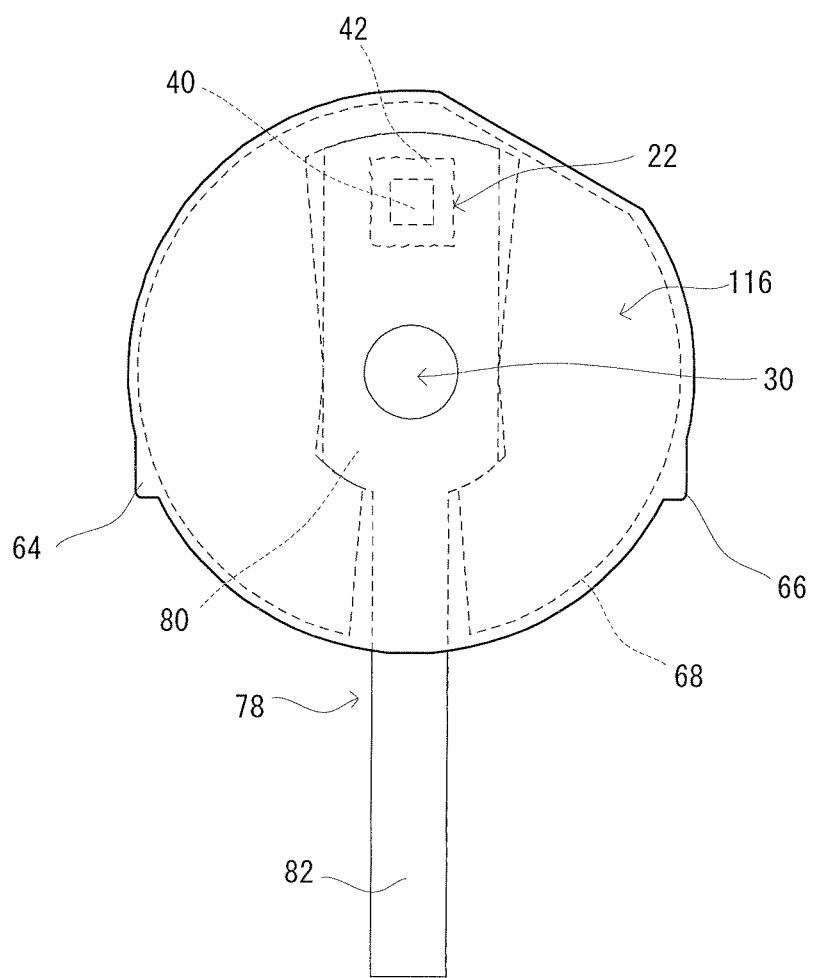
FIG. 23 is an illustrative view showing a major part of another embodiment of the present invention.
Figure 27:
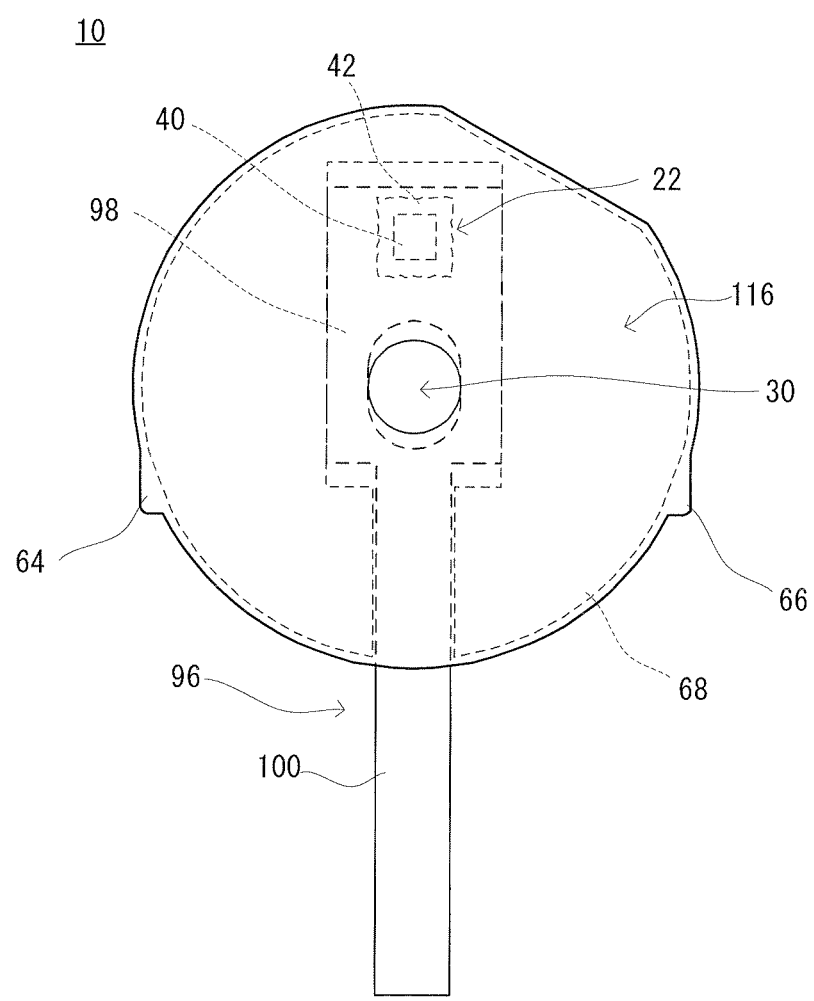
FIG. 27 is an illustrative view showing a major part of another embodiment of the present invention.

In all the preceding embodiments, the grip 20 and the disk portion 16 are formed as one piece, but in FIG. 23 and FIG. 27 embodiments, the case portion 116 and the grip 20 are separately provided.

FIG. 23 embodiment is made up of three (strictly four) components as shown in FIG. 24. That is, the grip portions 20a and 20b are respectively removed from the upper layer member 10a and the lower layer member 10b in FIG. 19 (FIG. 20) embodiment. That is, only the case portions 116a and 116b are included, and the upper layer member 10a' and the lower layer member 10b' which are connected at the connecting portion 10cA are used. The case portion 116a of the upper layer member 10a' is formed with the above-described protrusions 64a and 66a at the outer edge, and the case portion 116b of the lower layer member 10b' is formed with the corresponding protrusions 64b and 66b, and the window 44. Here, the central hole 30 is formed on both of the portions.

Such the upper layer member 10a' and the lower layer member 10b' are stacked with each other so as to be folded at the connecting portion 10cA. A spacer or a middle layer member 68 to be contained between the folded upper layer member 10a' and the lower layer member 10b' is utilized. The middle layer member 68 has a disk-like shape smaller in diameter than the case portions 116a and 16b, and has a vertically-long space 70 at the center extending the full length of the diameter and having a predetermined width.

A space 70 includes a vertically-long approximately rectangular first space 72 which is closed by the middle layer member 68 at one end and a second space 74 extending downward (on the side of the other end) from the first space 72 which is opened at one end. The first space 72 is formed to have a minimum width DD at a predetermined position (position corresponding to the center of the central hole 30) in a vertical direction, and to be increased in width upward and downward from the position of the minimum width DD. The second space 74 is formed to have a minimum width EE at a communicating portion with the first space 72, and to be increased in width toward the open end (downward) from the position. An inner edge 76 of the middle layer member 68 defining the one end of the first space 72 is formed as an arc having the center of the central hole 30 as its center.

Figure 24A:
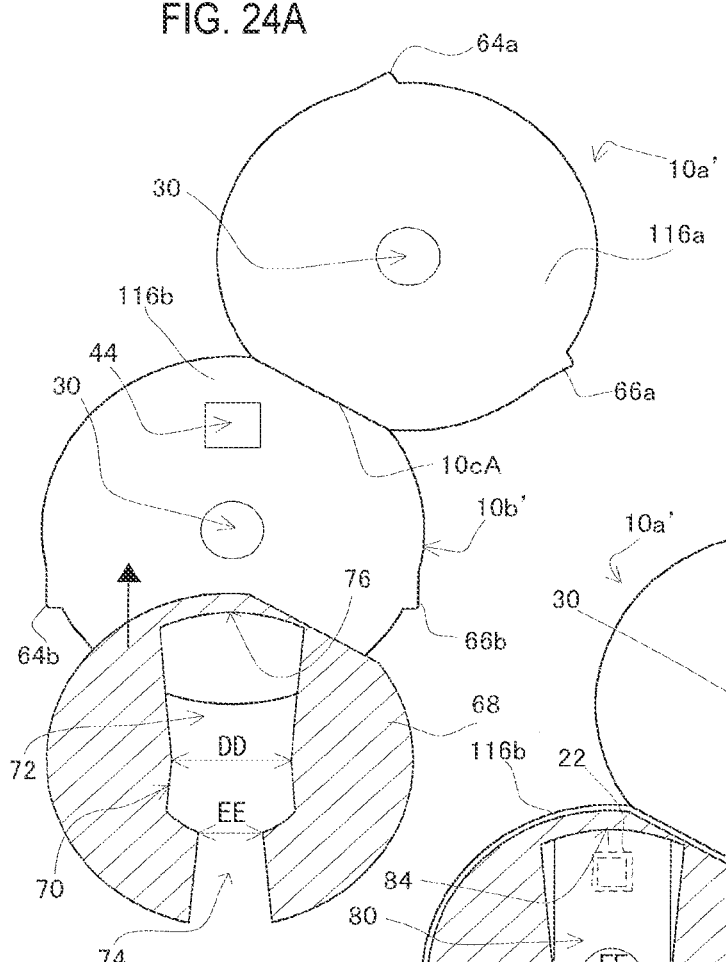
FIG. 24(A) shows a situation before an upper layer member and a lower layer member are folded.
Figure 24B:
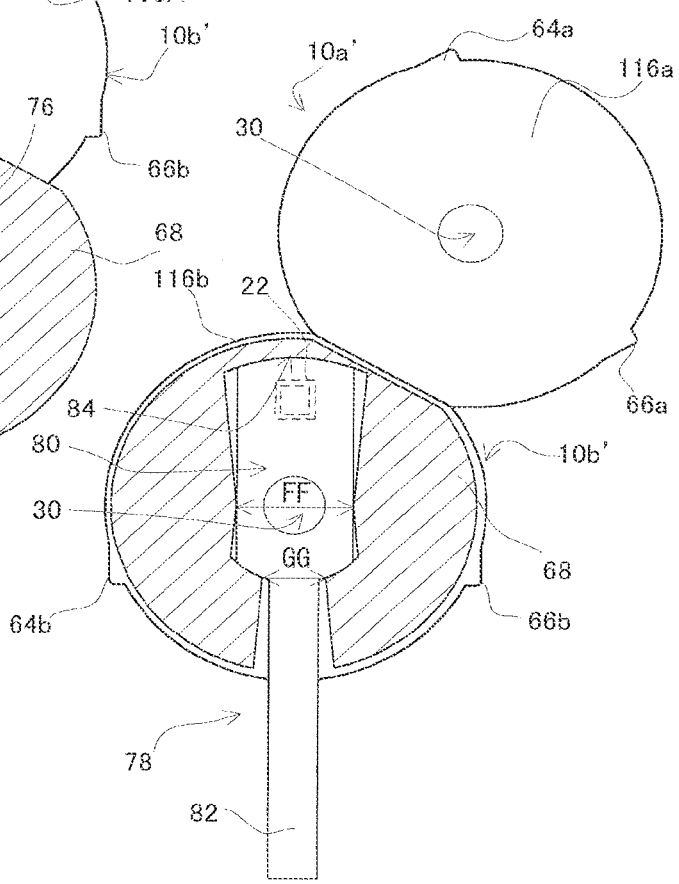
FIG. 24(B) shows a situation that a middle layer member is set at a predetermined position with both of the layers folded.

The space 70 is formed with an operating member 78 as shown in FIG. 24(B). The operating member 78 includes an rectangular portion 80 formed with the central hole 30 and to be contained or arranged within the first space 72 of the aforementioned space 70 and a rectangular grip portion 82 extending from the lower end of the rectangular portion 80. Here, the rectangular portion 80 is moved in response to the movement of the grip portion 82, and is thus constructed of a movable member. The rectangular portion 80 has an even width FF throughout its vertical length, and the width FF is set to be the same as or slightly smaller than the minimum width DD of the aforementioned first space 72. The grip portion 78 has an even width GG throughout its vertical length, and the width GG is set to be the same as or slightly smaller than the minimum width EE of the second space 72. A leading end 84 of the rectangular portion 80 of the operating member 78 is formed to be an arc with a curvature the same as or slightly smaller than the inner edge 76 of the closed end of the first space 72.

At a predetermined position of the rectangular portion 80 of the operating member 78, that is, at the position on the bottom surface that corresponds to the window 44 of the lower layer member 10b' when the operating member 78 is arranged within the space 70 of the middle layer member 68, the cleaning member 22 described before is applied by adhesive, for example. If the cleaning member 22 is enumerated, this embodiment is made up of four components.

In a case that the lens cleaner 10 shown in FIG. 23 is produced by utilizing the components shown in FIG. 24, the middle layer member 68 is placed at a predetermined position of the lower layer member 10b', and both of them are secured by the viscous layer or adhesive layer not shown (adhesive layer 46 in the previous embodiment) as shown in FIG. 24(A). In this state, the operating member 78 is contained and arranged within the space 70. That is, the rectangular portion 80 affixed with the cleaning member 22 on the bottom surface is contained within the first space 72, and the grip portion 82 is arranged within the second space 74. Then, the upper layer member 10a' and the lower layer member 10b' are folded at the connecting portion 10cA to thereby stack the upper layer member 10a' on the middle layer member 68 and the operating member 78. At this time, by the viscous layer or adhesive layer not shown (adhesive layer 46 in the previous embodiment), the middle layer member 68 and the upper layer member 10a' are secured.

Figure 25:
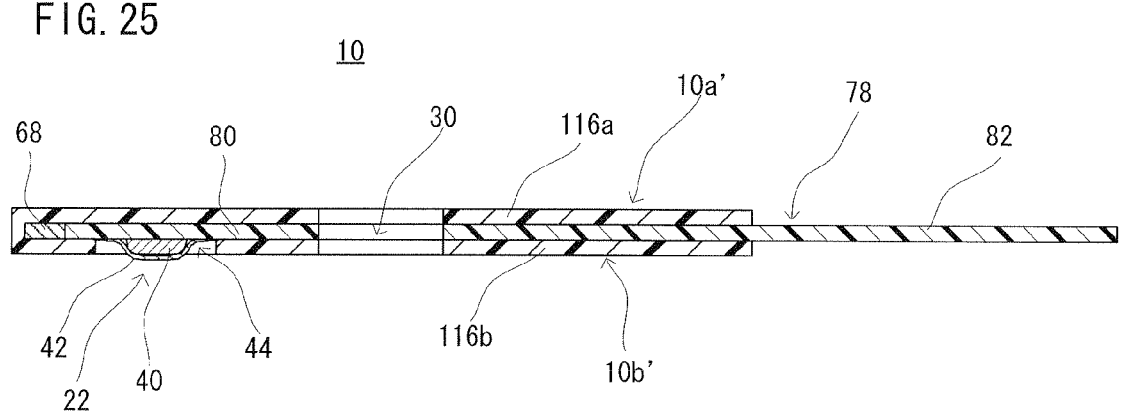
FIG. 25 is an illustrative view showing a cross-sectional structure of FIG. 23 embodiment.

Thus, the lens cleaner 10 in FIG. 23 having three-layered structure in cross section as shown in FIG. 25 can be obtained. As well understood from FIG. 25, the operating member 78 are sandwiched between the upper layer member 10a' and the lower layer member 10b', and similar to the previous embodiments, by holding the grip portion 82, the lens cleaner 10 can be handled.

When the lens cleaner 10 in FIG. 23 embodiment is inserted into the optical disk device 12 under an insertion restriction by the protrusions 64 and 66, the lens cleaner 10 is chucked into the turntable (not illustrated) by a chucking mechanism not shown. In this state, the cleaning member 22 provided on the bottom surface of the operating member 78, that is, the rectangular portion 80 is positioned so as to cover the objective lens 38 of the optical pickup. Here, the cleaning member 22 is applied with a cleaning agent, such as alcohol at this point similar to the previous embodiments.

Figure 26:
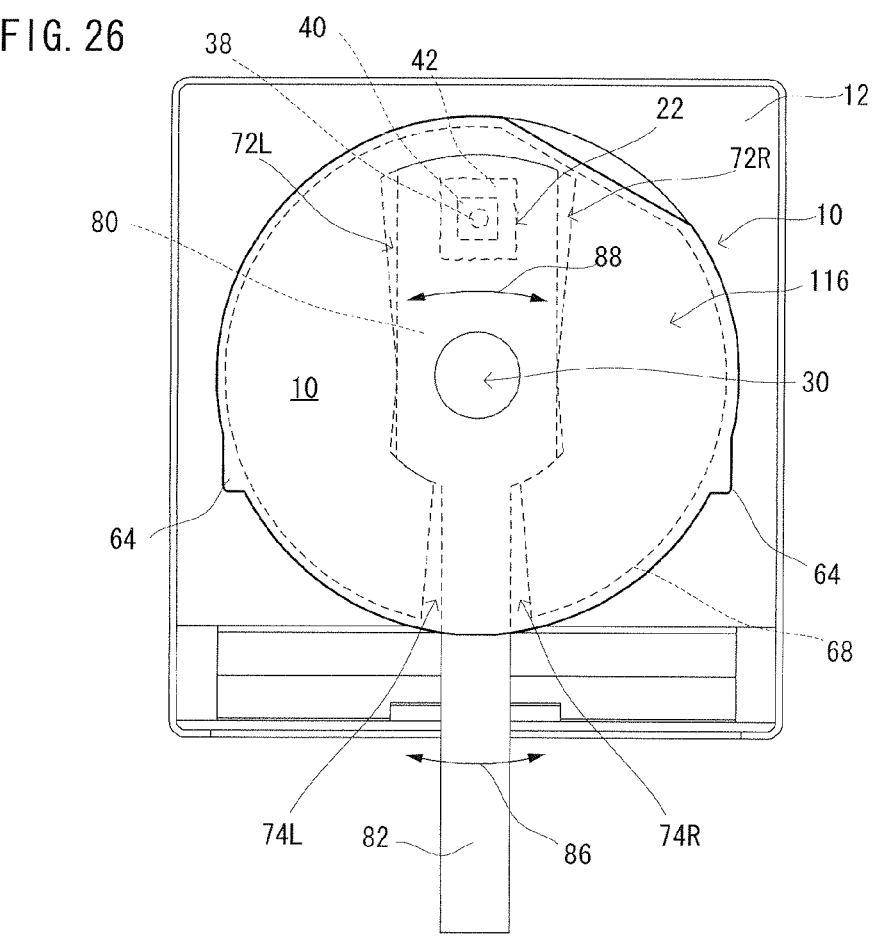
FIG. 26 is an illustrative view showing in plan a situation that the lens cleaner in FIG. 23 embodiment is inserted into the optical disk device.

If the grip portion 82 is swung right and left in this state according to an arrow 86 shown in FIG. 26, the rectangular portion 80 is turned to the right and left as shown by an arrow 88 with the portion of the minimum width DD shown in FIG. 24, that is, the center of the case portion 116 (central hole 30) centered. At this time, the movable member, that is, the leading-end arc 84 of the rectangular portion 80 moves along the leading-end arc 76 of the first space 72. The cleaning member 22 is affixed on the rectangular portion 80, and therefore, as the rectangular portion 80 is turned right and left, the cleaning member 22 is also displaced right and left. As described above, since the cleaning member 22 is brought into contact with the objective lens 38, the displacement of the cleaning member 22 right and left means that the objective lens 28 is to be rubbed by the cleaning member 22. That is, by turning or rotating the grip portion 82, the cleaning member 22 is moved to clean the objective lens 38.

Portions denoted by the reference numerals 72L and 72R shown in FIG. 26 are margins for movement of the rectangular portion 80 when the grip portion 82 is swung right and left. This is formed by gradually increasing the width of the first space 72 from the minimum width DD and keeping the width FF of the rectangular portion 80 uniform as described above. Similarly, portions denoted by the reference numerals 74L and 74R are margins for movement of the grip portion 82 when the grip portion 82 is swung to the right and left. This is formed by gradually increasing the width of the second space 74 from the minimum width EE and keeping the width GG of the grip portion 82 uniform.

In the embodiments shown in FIG. 23 to FIG. 26, the operating member 78 is turned to execute a cleaning operation. The range in which the operating member 78 can be turned or rotated is restricted by the case portion 116, so that the movable range of the cleaning member is restricted to the surroundings of the objective lens 38. Thus, it is possible to prevent the cleaning member 22 from making the lens dirty again by sweeping, and so forth the dust settled on the bottom of the drive. On the contrary thereto, in the lens cleaner shown in FIG. 27 to FIG. 30 embodiments, the operating member is moved or displaced back and forth to thereby execute a cleaning operation.

Explaining in detail, the lens cleaner 10 in FIG. 27 embodiment is constructed by three (four) components as shown in FIG. 28. That is, similar to FIG. 24, only the case portions 116a and 116b are included, and only the upper layer member 10a' and the lower layer member 10b' which are connected by the connecting portion 10cA are used. The protrusions 64a and 66a are formed at predetermined positions of the outer edge of the case portion 116a of the upper layer member 10a', and the protrusions 64b and 66b are formed at the case portion 116b of the lower layer member 10b' as well. The lower layer member 10b' is formed with the window 44A at the predetermined position. Here, the window 44A in this embodiment is slightly vertically-longer than those of the previous embodiments. Then, the central hole 30 is formed on both of them.

The spacer or the middle layer member 68 to be interposed between the upper layer member 10*a*' and the lower layer member 10*b*' is used. The middle layer member 68 has a disk-like shape smaller in diameter than the case portions 116*a* and 16*b*, and is formed with a vertically-long space 90 at the center extending the full length of the diameter and having a predetermined width similar to FIG. 24 embodiment.

The space 90 includes a vertically-long-approximately-rectangular first space 92 which is closed by the middle layer member 68 at one end and a second space 94 extending downward (on the side of the other end) from the first space 92 and being opened at the other end. The first space 92 is formed to have an even width throughout its vertical length and a predetermined length HH. The second space 94 is formed to have a width defined by the width at the communicating portion with the first space 92.

The space 90 is arranged with an operating member 96 shown in FIG. 28(A) as shown in FIG. 28(B). The operating member 96 is formed with a central hole 30A. The central hole 30A is formed to take a shape of an substantially vertical-long oval. The operating member 96 includes a rectangular portion 98 contained within the aforementioned first space 92 and a rectangular grip portion 100 extending outwardly from the lower end of the rectangular portion 98. Here, the rectangular portion 98 moves by moving its grip portion 100, and is constructed of a movable member. The rectangular portion 98 has an even width throughout its vertical length, and has a predetermined length II. The length II of the rectangular portion 98 is shorter than the length HH of the first space 92, and thus, the rectangular portion 98 is displaceable and movable lengthwise, that is, in a forward and backward direction within the first space 92. The grip portion 100 is formed to have a width the same as or slightly smaller than the width of the second space 94, keeping the width uniform throughout its vertical length.

At the predetermined position of the rectangular portion 98 of the operating member 96, that is, a position on the bottom surface that corresponds to the window 44A of the lower layer member 10*b*' when the operating member 96 is arranged inside the space 90 of the middle layer member 68, the cleaning member 22 is applied by adhesive, for example.

In a case that the lens cleaner 10 shown in FIG. 27 is manufactured by the components shown in FIG. 28, the middle layer member 68 is first placed at a predetermined position of the lower layer member 10*b*' as shown in FIG. 28(A), and both of them are secured by the viscous layer or adhesive layer not shown (adhesive layer 46 in the previous embodiment). In this state, the operating member 96 is contained and arranged in the space 90 as shown in FIG. 28(B). That is, the rectangular portion 98 affixed with the cleaning member 22 on the bottom surface is contained in the first space 92, and the grip portion 100 is arranged within the second space 94. Then, the upper layer member 10*a*' and the lower layer member 10*b*' are folded at the connecting portion 10*c*A to thereby stack the upper layer member 10*a*' on the middle layer member 68 and the operating member 96. At this time, by the viscous layer or adhesive layer not shown (adhesive layer 46 in the previous embodiment), the middle layer member 68 and the upper layer member 10*a*' are secured.

Thus, the lens cleaner 10 in FIG. 27 having cross section structure similar to the cross section structure of three layers shown in FIG. 25 can be obtained. On the analogy of FIG. 25, with respect to the lens cleaner as well, the operating member 96 is sandwiched between the upper layer member 10*a*' and the lower layer member 10*b*', and by holding the grip portion 100, the lens cleaner 10 can be handled.

When the lens cleaner 10 in FIG. 27 embodiment is inserted into the optical disk device 12 under an insertion restriction by the protrusions 64 and 66, the lens cleaner 10 is chucked into the turntable (not illustrated). In this state, the cleaning member 22 provided on the bottom surface of the operating member 96 is positioned so as to cover the objective lens 38 of the optical pickup. Here, the cleaning member 22 is applied with a cleaning agent, such as alcohol at this point similar to the previous embodiments.

If the grip portion 100 is swung backward and forward in a longitudinal direction, that is, a disk inserting direction according to an arrow 102 shown in FIG. 29(A) in this state, the rectangular portion 96 is displaced or moved straightly in the same direction as shown by an arrow 104. The cleaning member is affixed on the rectangular portion, and therefore, the cleaning member 22 is also displaced in accordance with the displacement of the rectangular portion 96. Since the cleaning member 22 is brought into contact with the objective lens 38, the displacement of the cleaning member 22 to backward and forward means that the objective lens 28 is to be rubbed by the cleaning member 22. That is, by moving the grip portion 100 backward forward, the cleaning member 22 is moved to clean the objective lens 38.

In FIG. 27 embodiment, the operating member 96, that is, the cleaning member 22 is moved backward and forward along the inserting direction of the disk portion (arrow 104 direction), so that this has more advantage than when the cleaning member 22 is moved in the right and left direction as shown in the previous embodiment. That is, each side of the objective lens 38 is pinched by metal fittings (not illustrated), and therefore, when the cleaning member 22 moves right and left with the objective lens 38, it follows that the cleaning member 22 rubs the metal fittings together with the objective lens 38. When the cleaning member rubs the metal fittings, dirt and dust held in the cleaning member drops from the cleaning member, and make the objective lens dirty again. On the contrary thereto, in the lens cleaner 10 in FIG. 27 embodiment, the cleaning member 22 moves backward and forward, and thus never rubs the aforementioned metal fittings. Moreover, there are relatively large spaces in front or at the back of the objective lens, and therefore, even if dirt and dust are dropped from the cleaning member, the dirt and dust are dropped in the spaces, and never make the objective lens dirty again.

In addition thereto, at the bottom of the drive (optical disk device 20), dust, etc. may settle. If the cleaning member is moved right and left with respect to the objective lens, it sweeps such a dust on the bottom surface and adhere it to the objective lens. In this embodiment, the cleaning member is moved backward and forward, and as shown in FIG. 29(B), the lens unit moves over the spaces provided for making the unit move, and this prevents the dust on the bottom surface of the drive from flying.

FIG. 30(A) is a cross-sectional view when the objective lens portion is viewed from a side, and FIG. 30(B) is a cross-sectional view when the objective lens portion is viewed from a depth direction. As understood from FIGS. 30(A) and 30(B), in a case that the cleaning member 22 is moved backward and forward, the cleaning member is not brought into contact with the drive 12, so that it is possible to prevent the dust settled on the drive from adhering to the objective lens. In FIG. 23 and FIG. 27 embodiment, when the cleaning member 22 need to be replaced, the upper layer member 10*a*' is peeled away from the middle layer member 68, then, the operating member 78 or 96 may be taken out to replace the cleaning member 22 and be incorporated therein again.

Each of FIG. 31 to FIG. 34 is an illustrative view showing a lens cleaner of another embodiment of the present invention. In either embodiment explained before, the sheet-like member 42 making up of the swelling soft member, that is, the cleaning member 22 is held by being sandwiched between the upper layer member and the lower layer member. In replacement, the sandwiched state between the upper layer member and the lower layer member is released, the base 40 is covered with a new sheet-like member 42, then, the new sheet-like member 42 is sandwiched between the upper layer member and the lower layer member.

Figure 31:
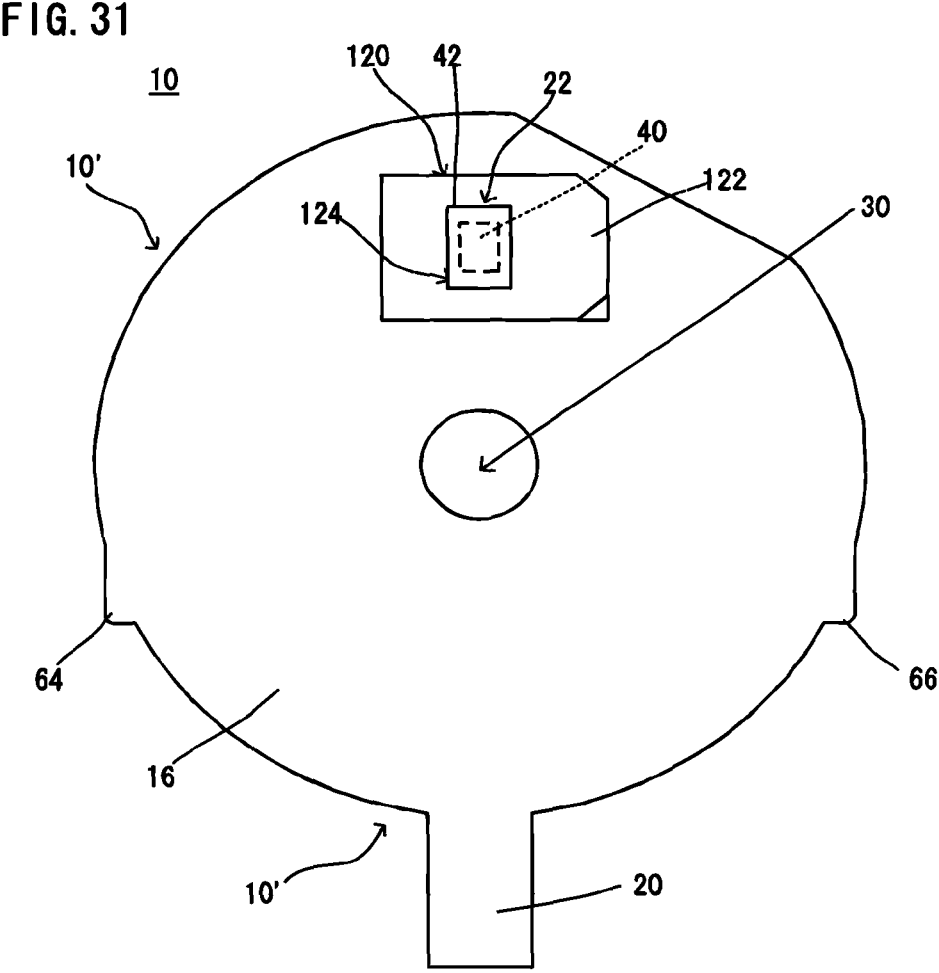
FIG. 31 is an illustrative view showing another embodiment of the present invention.

On the contrary thereto, in FIG. 31 embodiment, any one of the upper layer member and the lower layer member is used. That is, only a sheet of member 10' is used. The member 10' is also made of a plastic thin plate, such as polycarbonate, chloroethylene, for example, and includes the disk portion 16 having a plane shape and a size the same or approximately the same as those of the disk portion 16 in FIG. 19 embodiment as described above and the grip 20 extending toward a near side from the disk portion 16. Here, in this embodiment, the length of the grip 20 is designed to be slightly shorter than the grip 20 in FIG. 19 embodiment, for example. This is because the material is saved as little as possible in so far as the operability of the lens cleaner 10 is not detracted. Here, the thickness of the member 10' in this embodiment is set to be 1.2-1.5 mm, for example, and for the purpose of performing the same effect as FIG. 19 embodiment, at the same or approximately the same positions, the protrusions 64 and 66 having the same or approximately the same shape are formed on the disk portion 16 on either side.

In this embodiment, since the single sheet of member 10' is used, the sheet-like member 42 on the swelling soft member 22 cannot be retained to be sandwiched between the two layer members. Thus, at the back of the central through hole 30 on one main surface of the disk portion 16, a plane rectangular recess 120 is formed. The cleaning member 22 is affixed on the recess 120 by an adhesive sheet 122 (adhesive surface). That is, the cleaning member 22 includes the base 40 and the sheet-like member 42 for covering the base 40 similar to the aforementioned embodiments.

Figure 32:
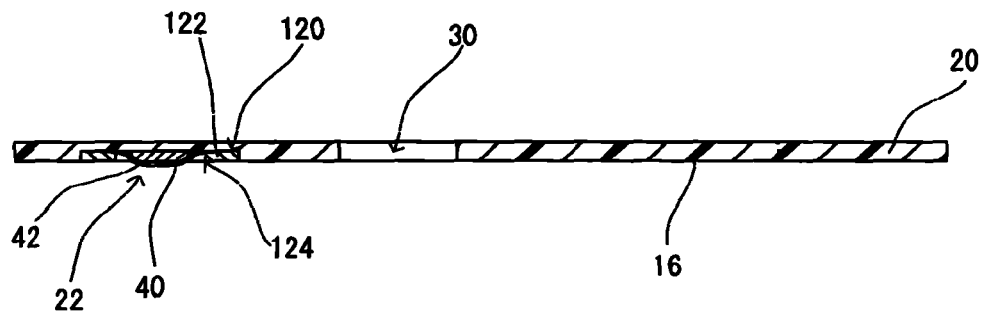
FIG. 32 is an illustrative view showing a cross-sectional structure showing FIG. 31 embodiment.

A window 124 is formed on the adhesive sheet 122, and as well understood from FIG. 32, the sheet-like member 42 covering the base 40 is exposed from the window 124, and the sheet-like member 42 around the base 40 is affixed on the bottom surface of the recess 120 by the aforementioned adhesive sheet 122. Thus, the sheet-like member 42 swelling due to the base 40 is exposed from the window 124 of the adhesive sheet 122 shown in FIG. 32, and further protrudes from the one surface of the member 10'. Here, the base 40 and the sheet-like member 42 are affixed by a proper means not shown.

By inserting the lens cleaner 10 of this embodiment into the optical disk device 12 and moving its grip 20 right and left similar to the lens cleaner 10 in FIG. 19 embodiment, it is possible to clean the objective lens 38 (FIG. 21) with the cleaning member 22.

In order to manufacture the lens cleaner 10 shown in FIG. 31 and FIG. 32, the member 10' having the disk portion 16, the grip 20, the central through hole 30, the protrusions 64, 66 and the recess 120 is prepared by producing by an adequate method, such as injection molding.

Figure 33:
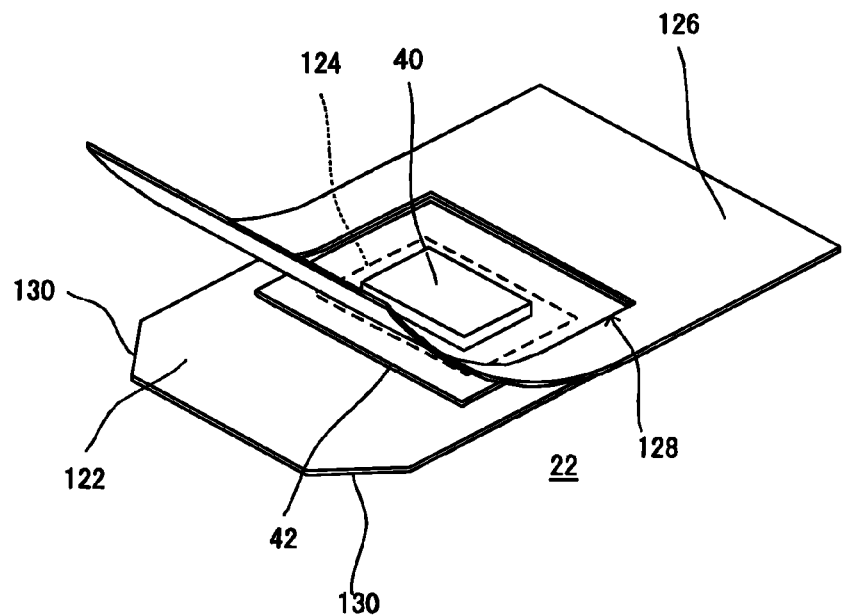
FIG. 33 is an illustrative view showing one example of a swelling soft member utilized in FIG. 31 embodiment.

On the other hand, the cleaning member 22 shown in FIG. 33 is prepared. In FIG. 33, the base to be affixed and covered with the sheet-like member 42 is omitted from the drawing. Then, the sheet-like member 42 is affixed on the adhesive sheet 122 so as to be exposed from the window 124 of the adhesive sheet 122, and the adhesive part of the adhesive sheet 122 is protected by the separator paper 126 in this state. Here, the separator paper 126 is also formed with the window 128. The window 128 is larger than the window 124 of the adhesive sheet 122 vertically and horizontally. Accordingly, the remaining sheet-like member 42 exposed from the window 124 is exposed from the window 128.

Figure 34:
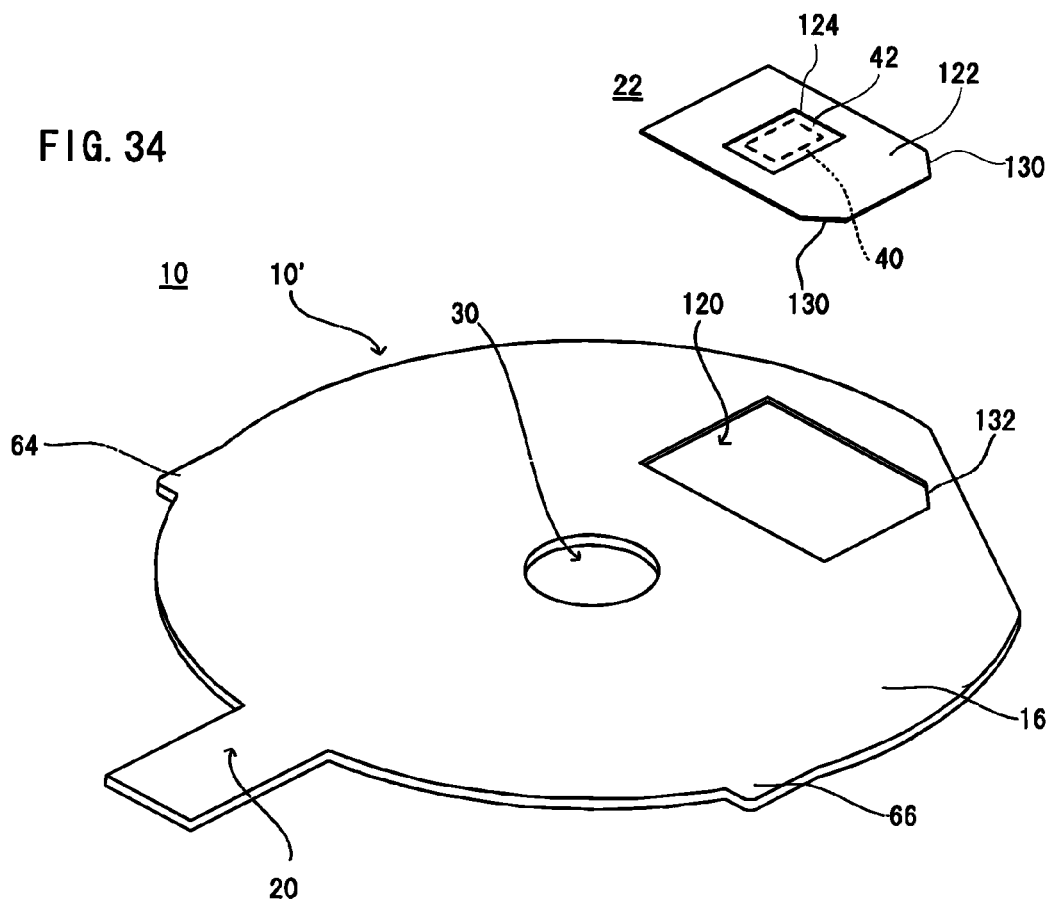
FIG. 34 is an illustrative view showing a process of manufacturing FIG. 31 embodiment.

Then, as shown in FIG. 34, the adhesive surface of the adhesive sheet 122 is affixed on the bottom surface of the recess 120 with the base 40 downward, that is, with the adhesive sheet 122 upside down unlikely to FIG. 33. At this time, two corners of the sheet-like member 122 on one side are formed by oblique lines 130, and in accordance therewith, one corner of the recess 120 is formed by an oblique line 132, and therefore, even if the user is a child, he or she never makes a mistake of a direction of the cleaning member 22 to be affixed within the recess 120. This is because that when the normal corner of the adhesive sheet 122 is fit into the corner formed by the oblique line 132 of the recess 120, the adhesive sheet 122 does not fit into the recess 120 well. This makes it possible to use the lens cleaner 10 of this embodiment.

Then, in order to replace the cleaning member 22, the adhesive sheet 122 is peeled away from the recess 120, and a new cleaning member 22 as shown in FIG. 33 may be affixed on the recess 120 again according to the aforementioned procedure.

It can be understood that that although not described in each embodiment, each of the embodiments and the modified example explained before may be applied to the other embodiments equally or by adding a proper change thereto if possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A lens cleaner to be used in an optical disk device incorporated with an objective lens, comprising:
    a disk portion which has a shape capable of being inserted into said optical disk device;
    a grip which is provided to said disk portion; and
    a swelling soft member which is provided at a predetermined position corresponding to said objective lens on a main surface of said disk portion, and is able to be brought into contact with said objective lens when said disk portion is inserted into said optical disk device, wherein said swelling soft member includes a base provided at said predetermined position on said main surface of said disk portion, and a sheet-like member which is put over said base so as to cover said base, wherein the base is positioned between the sheet-like member and said main surface of said disk portion, wherein a recess is formed at the predetermined position on the main surface of said disk portion, and wherein said soft swelling member is mounted in the recess such that sides of the recess fully surround the soft swelling member.

2. A lens cleaner according to claim 1, wherein said base comprises an elastic member.

3. A lens cleaner according to claim 1, wherein said sheet-like member around said base is mounted in the recess by a separate adhesive sheet.

4. A lens cleaner according to claim 3, wherein said sheet-like member is affixed on a bottom surface of said recess by the adhesive sheet.

5. A lens cleaner according to claim 1, wherein said swelling soft member has a smooth mount-like shape.

6. A lens cleaner according to claim 1, further comprising an insertion restraining member which is formed at an outer peripheral edge of said disk portion, and restrains an inserting direction of said disk portion.

7. A lens cleaner according to claim 1, wherein a thickness of the base is greater than a thickness of the sheet-like member.

\* \* \* \* \*